US012429446B2

(12) United States Patent
Liang et al.

(10) Patent No.: US 12,429,446 B2
(45) Date of Patent: Sep. 30, 2025

(54) HIGH-THROUGHPUT ELECTROCHEMICAL CHARACTERIZATION APPARATUS AND SYSTEM AND METHODS FOR USING THE SAME

(71) Applicant: Battelle Memorial Institute, Richland, WA (US)

(72) Inventors: Yangang Liang, Richland, WA (US); Wei Wang, West Richland, WA (US); Heather M. Job, Kennewick, WA (US); Juran Noh, Seoul (KR); Jie Bao, Richland, WA (US); Will Dean, Cleveland, OH (US); Ruozhu Feng, Richland, WA (US); Jing Wu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 194 days.

(21) Appl. No.: 18/382,402

(22) Filed: Oct. 20, 2023

(65) Prior Publication Data

US 2025/0130189 A1     Apr. 24, 2025

(51) Int. Cl.
*G01N 27/02*     (2006.01)
*G01N 35/00*     (2006.01)
*G01N 35/10*     (2006.01)

(52) U.S. Cl.
CPC ....... *G01N 27/026* (2013.01); *G01N 35/0099* (2013.01); *G01N 35/10* (2013.01)

(58) Field of Classification Search
CPC ... G01N 27/026; G01N 35/0099; G01N 35/10
See application file for complete search history.

(56) References Cited

U.S. PATENT DOCUMENTS

| 9,274,059 | B2* | 3/2016 | Yu | G01N 27/27 |
|---|---|---|---|---|
| 10,416,114 | B2* | 9/2019 | Chen | G01N 27/27 |
| 2002/0123069 | A1* | 9/2002 | Johnson | C12Q 1/001 |
| | | | | 435/7.1 |
| 2009/0286297 | A1* | 11/2009 | Pihl | G01N 35/1065 |
| | | | | 435/173.6 |
| 2021/0247357 | A1* | 8/2021 | Nakanishi | B01L 3/5085 |

* cited by examiner

*Primary Examiner* — Alvaro E Fortich
(74) *Attorney, Agent, or Firm* — Klarquist Sparkman, LLP

(57) ABSTRACT

Disclosed herein is an electrochemical characterization apparatus and system that facilitates high-throughput measurements of various different properties and/or performance characteristics of components of an energy storage and conversion device, such as an electrolyte and/or electrodes. Also disclosed are methods for using the electrochemical characterization apparatus and system.

20 Claims, 13 Drawing Sheets

HIGH-THROUGHPUT ELECTROCHEMICAL CHARACTERIZATION APPARATUS AND SYSTEM AND METHODS FOR USING THE SAME

ACKNOWLEDGMENT OF GOVERNMENT SUPPORT

This invention was made with government support under Contract No. DE-AC05-76RL01830 awarded by the Department of Energy. The government has certain rights in the invention.

FIELD

The present disclosure is directed to an apparatus and system for high-throughput electrochemical characterization and a method for using the apparatus and system.

BACKGROUND

The urgent need to transition to renewable energy sources and combat the climate change crisis necessitates advancements in energy storage technologies. Lithium-ion batteries and redox flow batteries have gained popularity as viable energy storage solutions, and extensive research has focused on improving their performance for long-duration applications; however, traditional research approaches have proven inadequate to meet the growing demands. To expedite the development process and achieve the zero-carbon emission target, the scientific community has turned to data-driven approaches in materials science. Although automation and robotic platforms have witnessed significant progress, the characterization techniques used in energy storage research have lagged behind.

Electrolytes serve as the lifeblood of Lithium-ion Batteries (LIBs) and Redox Flow Batteries (RFBs). Among the properties of electrolytes, ionic conductivity stands out as a key factor in determining the overall performance of batteries; however, the current methods employed to measure conductivity face certain limitations. Thus, it becomes imperative to develop a novel electrochemical system that is flexible and capable of high-throughput (HTP) use while delivering precise measurements. Such a device would address the shortcomings of existing methods and provide a comprehensive solution for determining the conductivity of electrolytes and other fuel cell performance characteristics.

To overcome drawbacks in the art and accelerate the discovery of green energy technologies, there exists a need in the art for a new apparatus and system that can be used to conduct HTP electrochemical characterizations to collect data/information that can be used to bridge the gap between the data-driven approach and efficient materials evaluation.

SUMMARY

Disclosed herein are embodiments of an electrochemical characterization apparatus, comprising: an electrode pair comprising (i) a first electrode, or a plurality thereof; and (ii) a second electrode selected from a unitary second electrode or a plurality of second electrodes; a holder component comprising an electrode-accepting unit that is physically coupled with the first electrode, or a plurality of electrode-accepting units that are, independently, physically coupled with individual first electrodes of the plurality of first electrodes; and a second electrode containment component comprising an opening that holds the second electrode, wherein the opening is free from any electrolyte prior to or during use.

Also disclosed herein are embodiments of a system, comprising: an electrochemical characterization apparatus according to any or all of the above embodiments; a cell plate comprising a plurality of cells, wherein the cell plate is positioned on a top surface of the second electrode; a robotic or manual sampling platform; and a measurement device; a dispensing device; a reference electrode, or plurality thereof; a power source; or a combination thereof.

Also disclosed herein are embodiments of a method for conducting electrochemical characterization, comprising: providing a system according to any or all of the above embodiments; adding an electrolyte into cells of the cell plate; using the robotic or manual sampling platform to control movement of the holder component of the electrochemical characterization apparatus such that the first electrode is, or the plurality thereof are, disposed into the electrolyte contained within individual cells of the cell plate; performing electrochemical screening with the system; and measuring a performance of the electrolyte, the plurality of first electrodes, or the second electrode during the electrochemical screening.

The foregoing and other objects, features, and advantages of the present disclosure will become more apparent from the following detailed description, which proceeds with reference to the accompanying figures.

BRIEF DESCRIPTION OF THE DRAWINGS

FIGS. 1A and 1B are schematic illustrations of components of an electrochemical characterization apparatus according to aspects of the present disclosure, wherein FIG. 1A shows a holder component and a plurality of first electrodes, and FIG. 1B further shows how the first electrodes in the holder component can be aligned with cells of a cell plate as described herein.

FIGS. 9A and 9B are schematic illustrations of a second electrode containment component, wherein FIG. 9A shows a top-down view of the second electrode containment component and shows the opening into which a second electrode can be placed; and FIG. 9B shows how the second electrode containment component can be used to couple the second electrode to a cell plate.

FIGS. 12A-12C show results from using an electrochemical characterization apparatus/system according to the present disclosure, wherein FIG. 12A illustrates an equivalent circuit used to represent the qualitative features of impedance spectra; FIG. 12B is a Nyquist plot of the real part of impedance against the negative value of the imaginary part of impedance showing the resistance for an electrolyte evaluated with the apparatus/system; and FIG. 12C is a Bode plot of the magnitude of the impedance and phase angle against frequency.

FIGS. 13A and 13B are graphs showing a background measurement and an actual electrolyte sample measurement, which were used for analyzing results obtained from using an electrochemical characterization apparatus/system according to the present disclosure, wherein FIG. 13A is a graph of the frequency dependence of the real part of impedance as measured by pressing the working electrode on bottom electrode; and FIG. 13B is a representative Nyquist plot measured at 25° C. in 0.1 M NaCl solution with a frequency range of $10^5$ to $10^3$ Hz.

FIGS. 14A-14C show results from using an electrochemical characterization apparatus/system to measure resistance of electrolytes, wherein FIG. 14A shows modeling of current spreading through the liquid electrolyte; FIG. 14B shows the resistance of a KCl electrolyte as a function of a first electrode diameter at 25° C.; and FIG. 14C shows the resistance of the KCl electrolyte as a function of the distance between the first and second electrodes at 25° C.

DETAILED DESCRIPTION

Overview of Terms

Figure 1A:
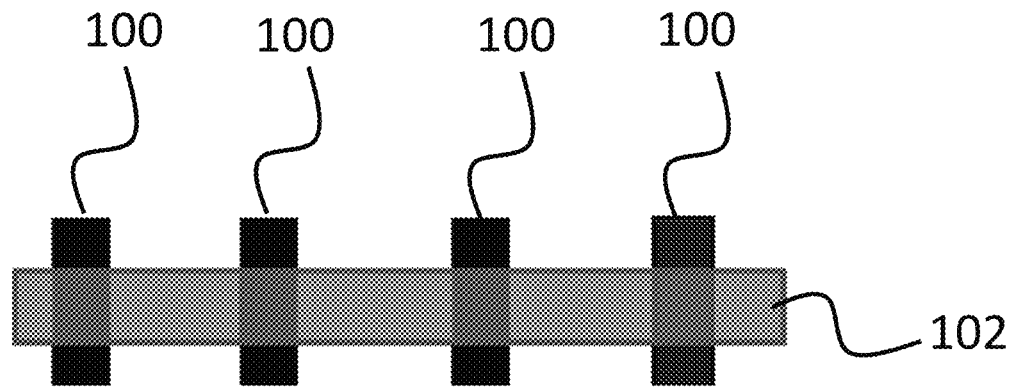

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "introduce," "flow," or "provide" to describe the disclosed methods. These terms are high-level abstractions of the actual operations that are performed. The actual operations that correspond to these terms may vary depending on the particular implementation and are readily discernible by one of ordinary skill in the art.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Directions and other relative references (e.g., inner, outer, upper, lower, etc.) may be used to facilitate discussion of the drawings and principles herein but are not intended to be limiting. For example, certain terms may be used such as "inside," "outside," "top," "down," "interior," "exterior," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

In order to facilitate review of the various embodiments of the disclosure, the following explanations of specific terms are provided:

Working Electrode: An electrode of an electrode pair wherein a reaction of interest occurs.

Reference Electrode: An electrode that can be used in conjunction with electrodes of an electrode pair and that comprises a stable and known/defined electrode potential.

Counter Electrode: An electrode of an electrode pair that closes a current circuit in an electrochemical cell and that can host redox reactions that balance redox reactions occurring at the working electrode.

Electrolyte: A material that transfers ions back and forth between electrodes of an electrode pair to facilitate charge and discharge of the battery. Electrolytes according to the present disclosure can comprise ions in solution, gel, and/or solid form.

Void Space: A region of space that is not filled by any material. For example, electrodes of a plurality of second electrodes as described herein can be separated by a void space wherein no separate material is located within the void space.

Electrically Coupled: This term is used to describe a situation wherein two or more components of an electrochemical apparatus and/or a system as described herein are coupled together, directly or indirectly, such that they are in electrical communication. Electrical communication arises when the two components can transfer electrical energy between one another or from one component to another component.

Physically Coupled: This term is used to describe a situation wherein two or more components of an apparatus and/or a system as described herein are coupled together, directly or indirectly such that they are physically joined together.

Physical (Physically) Contact: This term is used to describe a situation wherein an electrolyte touches another component of an apparatus or system described herein. For example, an electrolyte can touch a first electrode when the first electrode is disposed within the electrolyte, such as if/when the electrolyte is a fluid, or when the first electrode contacts the electrolyte, such as if/when the electrolyte is a gel or solid. As another example, an electrolyte can touch a surface of a second electrode when it is placed within a cell of a cell plate that is physically coupled to the second electrode.

Ionically Associated: This term is used to describe a situation a first apparatus portion and a second apparatus portion are able to transfer ions between a first electrode and a second electrode through an electrolyte.

Introduction

The ability of data-driven materials research to provide useful tools for scientific discovery and optimization has been demonstrated in certain fields; however, the application of a data-driven research method to complex materials systems has several hurdles, such as a lack of large-scale and high-quality datasets, appropriate algorithms, and the development of accurate/reliable prediction models. Especially, in the field of battery research and development, the capacity to generate large amounts of experimental samples through the development of automated platforms and workflows frequently outpaces the ability to characterize these samples for the building of material-property databases. For instance, commercial conductivity meters suffer from compatibility issues and constraints in sample volume. Even when using a mini conductivity meter (e.g., Mettler Toledo 751-4MM Conductivity Cell, 0.01-100 mS/cm), the measurement range often restricts accurate measurements. And, conventional methods and devices that might be used for assessing electrolyte and/or electrochemical performance (and/or other properties/components used in the battery field) encounter similar limitations because they often rely on using commercial conductivity meters.

Conventional HTP electrochemical techniques are primarily used in the fields of biotechnology and catalysis and are developed specifically for electrosynthesis and sensors. Devices used in such techniques, however, are not amenable to methods for evaluating components (e.g., electrolytes, electrodes, and the like) and/or performance of electrochemical devices or other energy storage media. Such devices and methods do not inform a user about performance of individual components involved in electrochemical devices/energy storage and certainly cannot be used to identify potential enhancements that can be made to electrolyte formulations and/or provide a library of information for use in selecting, e.g., energy storage and conversion device components and systems.

Electrochemical impedance spectroscopy (EIS) is one exemplary tool in the field of electrochemistry that can benefit from HTP analysis. EIS plays a role in probing the kinetic effects responsible for the electrical properties of electrochemical materials and devices. By utilizing small voltage oscillations as excitations and measuring the resulting oscillating current response, EIS enables the determination of ion diffusion kinetics in electrochemical materials through the fitting of spectra to equivalent circuit models. Widely employed in the battery field, EIS effectively studies various electrochemical properties, including reaction behavior and conductivity. Its advantages encompass a wide range of conductivity coverage, differentiation between ionic and electronic conductivity, and highly accurate measurements. Moreover, its flexibility, nondestructive nature, and in-situ applications make it a preferred choice for researchers and engineers. The growing significance of EIS in the battery field highlights the immense value and high demand for the development of a HTP device that can be used to measure EIS. Such a device would facilitate faster and more efficient characterization of electrochemical systems, leading to increased throughput and productivity in battery research and development. The demand for HTP EIS measurement arises from the need to address the ever-increasing complexity and diversity of battery materials and designs. There are limited reports on the use of HTP EIS, particularly in liquid solutions, which is a particular drawback in batteries utilizing liquid electrolytes. Developing HTP conductivity measurement based on EIS in liquid solutions poses several challenges, including automation and throughput, accuracy, sample variability, and flexibility. Standardization and calibration are needed to establish consistent and comparable protocols and methods for HTP conductivity measurements across different systems.

Disclosed herein is an apparatus and system for use in HTP electrochemical characterization that can be used for analyses that typically are conducted in the field of energy storage, including evaluating electrode, electrolyte, and/or fuel cell performance. In particular aspects, methods are disclosed pertaining to using the disclosed apparatus/system for EIS analysis, cyclic voltammetry (CV) measurement, electrolyte conductivity, etc. The apparatus can be integrated with a robotic and/or manual platform used in standard automated technologies to provide an HTP system. The apparatus and system offer design flexibility, high automation, and the ability to conduct various electrochemical analyses (e.g., conductivity measurements of various electrolytes, CV, EIS, etc.) with minimal interruptions and/or modifications during use. By enabling efficient and rapid screening of fuel cell components (e.g., electrolytes, redox active materials, electrode materials, and the like), the disclosed apparatus and system hold great potential for expediting the discovery of novel energy materials, ultimately contributing to the advancement of energy storage technologies. The disclosed apparatus and system are capable of collecting large-scale and high-quality physicochemical and electrochemical property data to provide a library of such information that can be readily accessed by a user desiring a particular energy storage and conversion device configuration and/or particular electrochemical performance.

Electrochemical Characterization Apparatus and System

Aspects of the present disclosure are directed to an electrochemical characterization apparatus and system for use in evaluating performance of electrochemical cells and/or components thereof, including (but not limited to) electrolytes, redox active materials, electrode materials (e.g., cathode materials, anode materials, and the like), membranes, battery cells, and the like. In particular aspects of the disclosure, the electrochemical characterization apparatus comprises an electrode pair, wherein the electrode pair comprises a first electrode (or a plurality of first electrodes) and a second electrode (or a plurality of second electrodes). The electrochemical apparatus further comprises components that can be used to contain and/or control the electrode components such that they can be easily manipulated during use (such as during an HTP analysis). Such components are described herein.

The first and second electrodes can be made of any suitable electrode material known to those in the art with the benefit of the present disclosure. In aspects of the disclosure concerning a plurality of first electrodes or a plurality of second electrodes, the individual electrodes of each plurality can be the same or different in terms of size and/or material. In aspects of the disclosure, the electrode material for the electrodes can be selected based on the type of evaluations to be conducted with the electrochemical characterization apparatus or system. In particular aspects of the disclosure, the first electrode comprises a material selected to provide a working electrode and the second electrode comprises a material selected to provide a counter electrode. In an independent aspect of the disclosure, the first electrode can comprise a material to provide a counter electrode and the second electrode can comprise a material to provide a working electrode. In particular aspects of the disclosure, the first and second electrode can be selected to provide an electrode pair that is a cathode and an anode. In exemplary aspects of the disclosure, the first electrode comprises glassy carbon, other carbon-based electrodes (graphite, carbon paste, graphene, etc.), platinum (Pt), gold (Au), silver (Ag), conducting metal oxides, metal alloys, conducting polymers, and the like. In exemplary aspects of the disclosure, the second electrode comprises graphite, carbon-based materials (e.g., glassy carbon, carbon paste, graphene, etc.), platinum (Pt), gold (Au), silver (Ag), conducting metal oxides, metal alloys, conducting polymers, and the like.

The first electrode can have any desired shape or size (length, thickness, and/or diameter). In aspects of the disclosure comprising a plurality of first electrodes, each electrode of the plurality can have the same or different size and/or shape as the other electrodes of the plurality. In particular aspects of the disclosure, the first electrode has a shape and size (length, thickness, and/or diameter) suitable for fitting within a cell of a cell plate used in conjunction with the apparatus (and as part of the system), such as square, rectangular, cylindrical, hemispherical, and the like. In representative aspects of the disclosure, the first electrode is cylindrical. In yet further representative aspects, the first electrode further has a diameter and/or shape suitable for fitting within electrode-accepting units of a holder component as described herein. In further representative aspects, the first electrode has a length sufficient to allow the electrode to be positioned within a holder component (described herein) and to allow the electrode to be disposed into a cell of the cell plate such that it can physically contact an electrolyte contained therein.

Figure 1B:
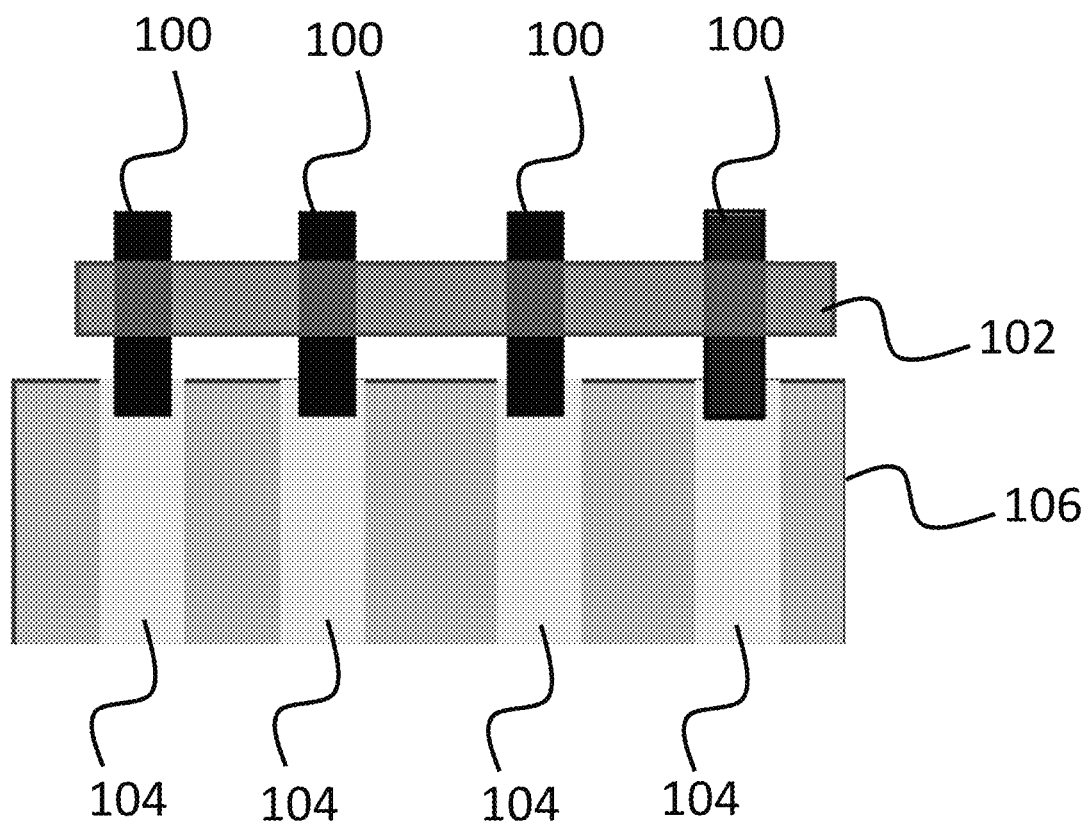

A representative example of a plurality of first electrodes is illustrated in FIGS. 1A and 1B. With reference to FIG. 1A, a plurality of individual first electrodes 100 are aligned next to one another and are physically separated when positioned within holder component 102. Individual first electrodes 100 are positioned within holder component 102 in a pattern that matches cells 104 of cell plate 106 so that individual first electrodes can be disposed within a depth of an individual cell as shown in FIG. 1B.

Figure 2A:
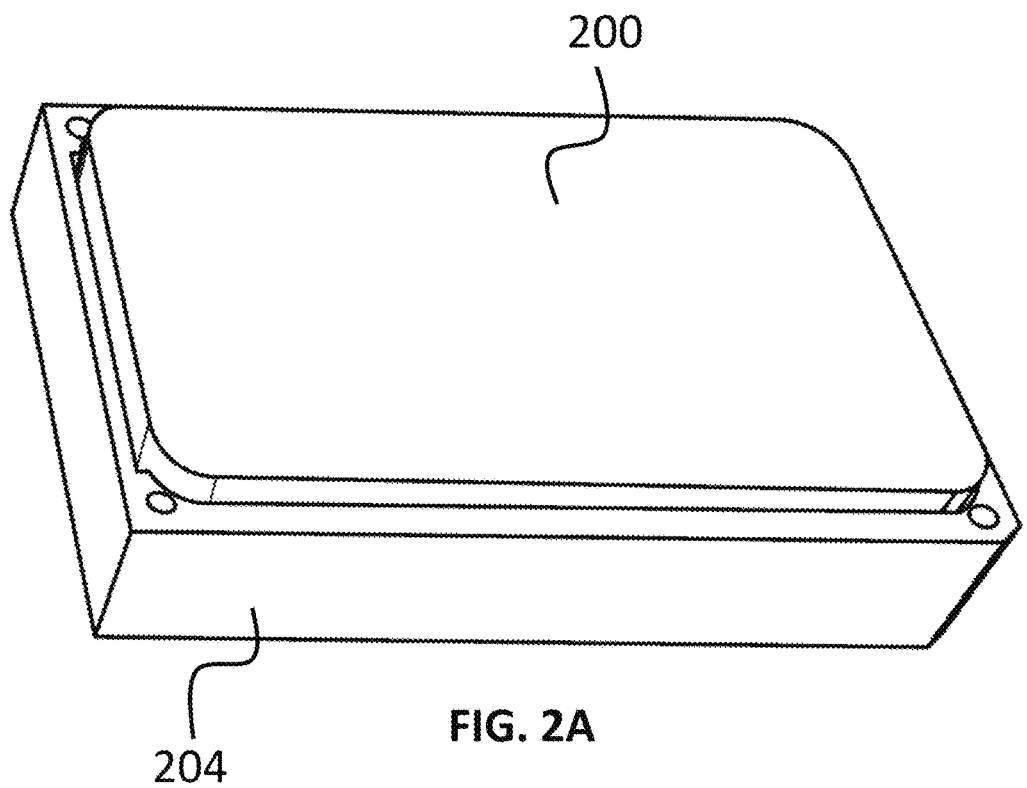
FIGS. 2A and 2B are schematic illustrations of (i) a unitary second electrode contained within a second electrode containment component; and (ii) a plurality of second electrodes contained within a second electrode containment component.
Figure 2B:
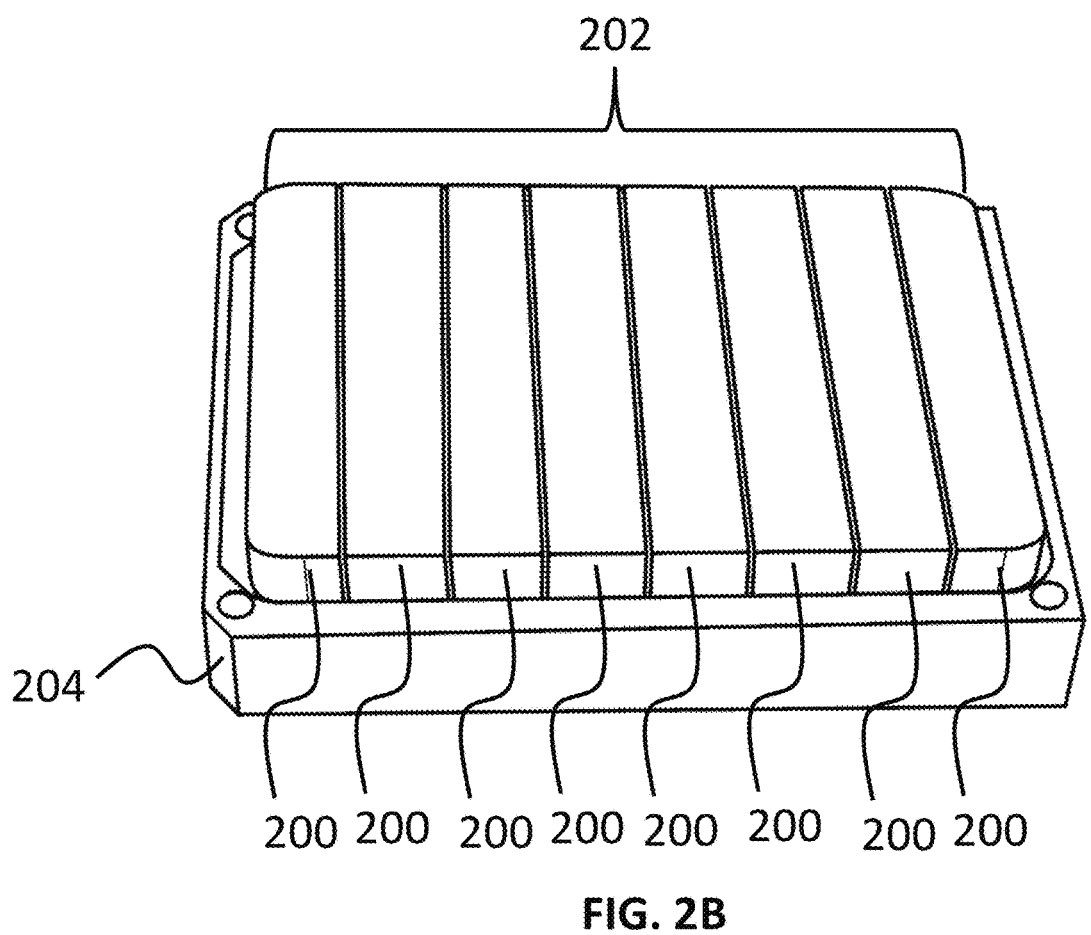

The second electrode can be provided as a single unitary electrode or it can be provided as a plurality of second electrodes. For example, FIG. 2A shows a single unitary second electrode 200 according to certain aspects of the disclosure, whereas FIG. 2B shows a plurality of second electrodes 200. In certain aspects using a plurality of second electrodes, each individual electrode of the plurality is separated from any adjacent electrode of the plurality of second electrodes by a void space or by a separator. In some aspects of the disclosure using a plurality of second electrodes, each individual electrode of the plurality of second electrodes physically touches any adjacent second electrode. The second electrode also can be selected to have any suitable shape or size, such as square, rectangular, cylindrical, hemispherical, and the like. In particular aspects of the disclosure, the second electrode has a shape and size that is the same or substantially the same as a cell plate used with the apparatus (wherein "substantially the same size" refers to a total surface area of a second electrode that is at least 70% of the total surface area of the cell plate, or at least 80%, or at least 90%, or at least 95% of the total surface area of the cell plate). In aspects of the disclosure comprising a plurality of second electrodes, each electrode independently has a shape and size that allows the individual second electrodes to be aligned so as to form an electrode block, wherein the electrode block is of a shape and size that fits within a second electrode containment component (discussed herein).

A representative example of a plurality of second electrodes is illustrated in FIG. 2B. With reference to FIG. 2B, a plurality of individual second electrodes 200 are aligned next to one another and can physically touch or be separated by a void space to provide electrode block 202. Electrode block 202 is able to fit within an electrode containment component 204 for use with the apparatus/system. The size (length, width, and thickness) of the second electrode is not intended to be limited, but in some aspects of the disclosure, certain size parameters (e.g., thickness) of the second electrode can be controlled/selected so as to influence characterization capabilities of the apparatus/system.

The apparatus further comprises a holder component that is configured to hold and direct movement of the first electrode (or the plurality of first electrodes) during use. The holder component also can be used to hold and direct movement of any reference electrode that might be used with the apparatus. The holder component and any first electrode and/or reference electrode are detachable from one another. Typically, during use of the apparatus and system, the holder component and any electrode held therein are physically coupled. In aspects of the disclosure, the holder component and the second electrode are not in physical contact and instead are physically separated by a cell plate, which is described herein. The holder component comprises one or more electrode-accepting units (e.g., one or more openings, slots, mounts, grips, or other attachment means) that are configured to accept the first electrode (or individual electrodes of a plurality of first electrodes) and/or any reference electrode (if used) and hold the electrode in a fixed position. Typically, one electrode-accepting unit holds one first electrode (in addition to any reference electrode, if used). A plurality of electrode-accepting units can be used to thereby provide a means for attaching a plurality of first electrodes of the holder component. In some aspects of the disclosure, the one or more electrode-accepting units can be integrated (either permanently or detachably) with the holder component. In other aspects of the disclosure, the electrode-accepting unit can be part of the holder component itself, such that it is unitary with the holder component. For example, the electrode-accepting unit can be an opening created in the holder component.

The holder component can be any shape or size, but typically is designed so as to provide an arrangement of a plurality of first electrodes that allows each individual electrode of the plurality to align with cells of a cell plate used with the system such that each individual first electrode can be inserted into a depth of an individual cell. The holder component allows for similar action of any reference electrode, if used. The electrode-accepting unit of the first holder can be arranged such that the electrodes become spaced apart from one another and do no touch when positioned within the holder component. In some aspects of the disclosure, plural electrode-accepting units are provided in a desired pattern, such as a pattern that matches one or more rows of cells of a cell plate that can be used in conjunction with the system during use, as described herein. In aspects of the disclosure utilizing a holder component that includes a plurality of openings as the electrode-accepting unit, each opening can have the same or different diameter. In some aspects of the disclosure, the plurality of openings can have different diameters so as to accept individual first electrodes that have different diameters. The holder component can comprise one or more clamps, handles, and/or other fastening or tightening means (e.g., wing nuts, bolts, or the like) that facilitates the ability to stabilize the first electrode (or plurality of first electrodes) within the holder component and/or to facilitate use with a robotic and/or manual sampling platform (e.g., a robotic arm or other controlling mechanism that can grasp and maintain physical control over the holder component during use of the system). The holder component can be made of any suitable material, such as a polymer material, metal, glass, or other material. In particular aspects of the disclosure, the first holder is made of a plastic material.

Figure 3:
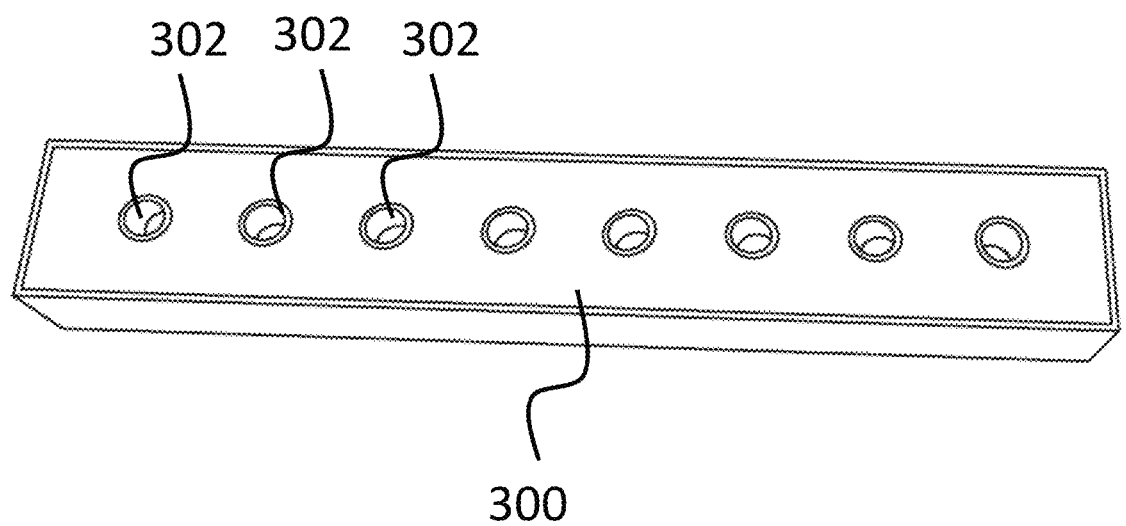
FIG. 3 is a schematic illustration of a holder component according to aspects of the present disclosure.
Figure 4:
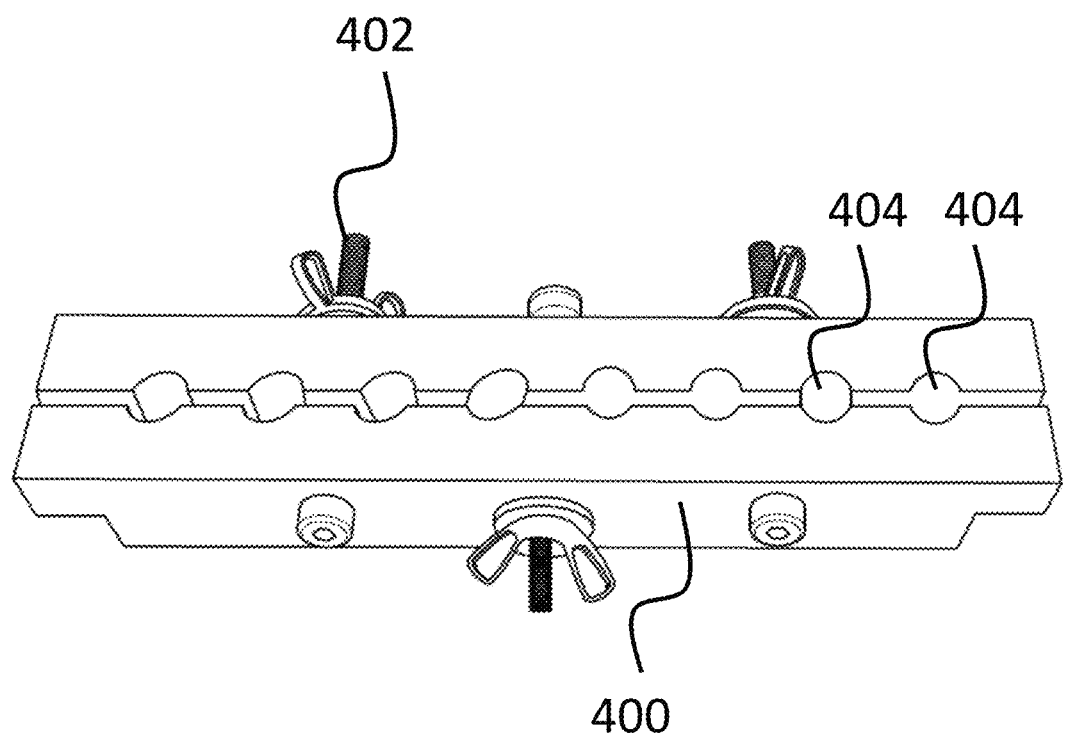
FIG. 4 is a schematic illustration of a holder component comprising fastening/tightening means used to facilitate holding first electrodes within the holder component as described herein.
Figure 5:
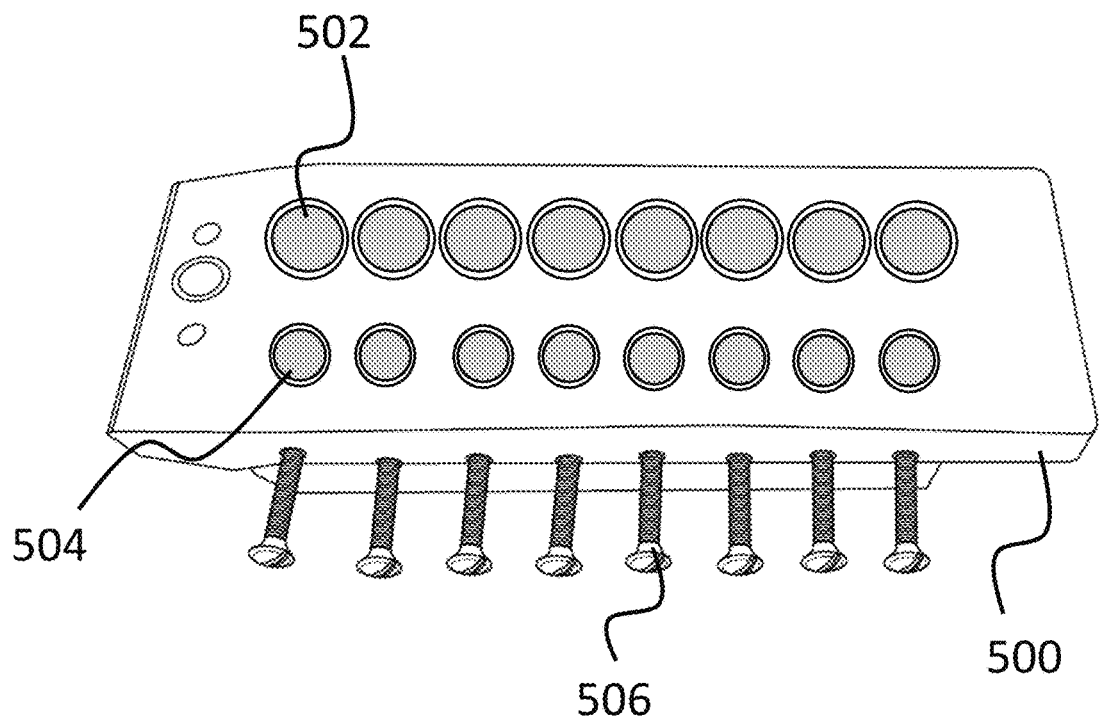
FIG. 5 is a schematic illustration of a holder component comprising different sized openings for accepting different sized first electrodes.

Representative holder components are shown in FIGS. 3, 4, and 5. As shown in FIG. 3, holder component 300 comprises a plurality of openings 302 that can each accept and hold a first electrode (not illustrated). As shown in FIG. 4, holder component 400 can further comprise one or more fastening or tightening means (e.g., wing nuts and bolts 402) that facilitate stabilizing a plurality of first electrodes within openings 404 of the holder component. Another representative holder component is shown in FIG. 5. Holder component 500 of FIG. 5 can comprise a plurality of openings, wherein openings of different sizes (e.g., larger openings 502 and smaller openings 504) can be provided so as to accommodate a plurality of first electrodes having different diameters (not illustrated). Fasteners 506 can be used to hold the electrodes in place.

Figure 6:
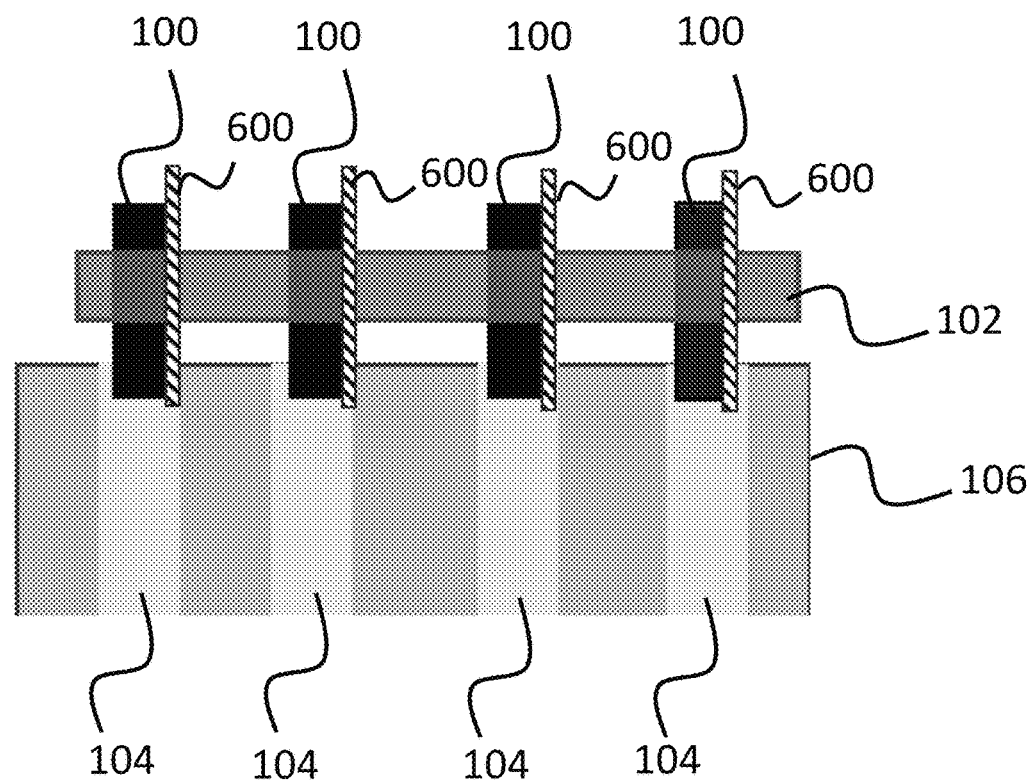
FIG. 6 is a schematic illustration of a holder component and cell plate configuration wherein the holder component is physically coupled with a plurality of reference electrodes in addition to a plurality of first electrodes.

In some aspects of the disclosure, the apparatus can further comprise a reference electrode (or a plurality of reference electrodes). In such aspects, the first electrode and the reference electrode can be positioned within the holder component such that a pair of first electrode and reference electrode are positioned within an electrode-accepting unit such that the pair can be disposed into the same cell of a cell plate during use. The first electrode and the reference electrode can comprise the same or different material. In some aspects of the disclosure, the reference electrode can be selected from Ag/AgCl, Ag/AgNO$_3$, a saturated calomel electrode (or SCE), and/or pseudo-reference electrodes (e.g., Ag, Pt, Au, Li, and the like). FIG. 6 shows an apparatus set-up comprising holder component 102 that holds first electrodes 100 and further includes reference electrodes 600 that, along with the first electrodes, can be disposed within an electrolyte contained within cells 104 of cell plate 106.

The electrochemical characterization apparatus can further comprise a cell plate as discussed herein. The cell plate can be an integrated component of the apparatus, or it can be a separate component that can be physically coupled with the apparatus prior to use of the apparatus and/or system. The cell plate typically is a substrate that comprises a plurality of cells. The cells are openings similar to wells of a well plate used in biological assays except that cells of the cell plate are open at both ends so that materials placed within each cell (e.g., electrolytes, including liquid electrolytes, gel electrolytes, slurry electrolytes, solid electrolytes, and the like) can physically contact both the first and second electrodes during use. In such aspects, the cell plate can further comprise one or more seals (e.g., O-rings or other type of sealing gasket) that facilitates adherence of the cell plate to a surface of the second electrode such that leakage of any fluid within a cell is prevented. The cell plate can comprise any suitable number of cells, such as two or more cells to 1536 or more cells, such as 8 or more cells, 16 or more cells, 24 or more cells, 48 or more cells, 96 or more cells, 384 or more cells, 864 or more cells, or 1536 or more cells. The size of the cells can be selected depending on the scale of analysis to be conducted, such as by evaluating how much electrolyte is needed. In some aspects of the disclosure, the cells are selected to provide an electrolyte volume ranging from 50 µL to 1000 µL. The cell plate can be made of any material compatible with organic solvents and/or aqueous solvents, such as a plastic material, a glass material, or the like.

Figure 7:
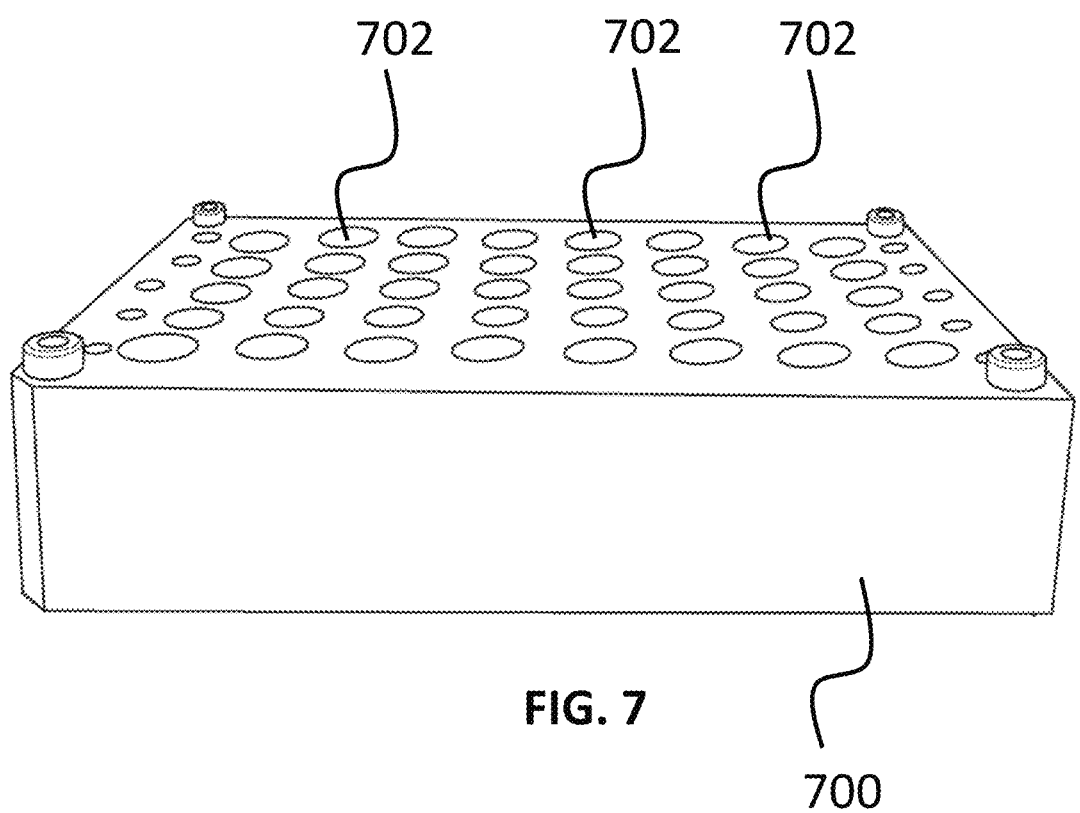
FIG. 7 is a schematic illustration of a cell plate comprising a plurality of cells which can be used to contain an electrolyte as described herein.
Figure 8:
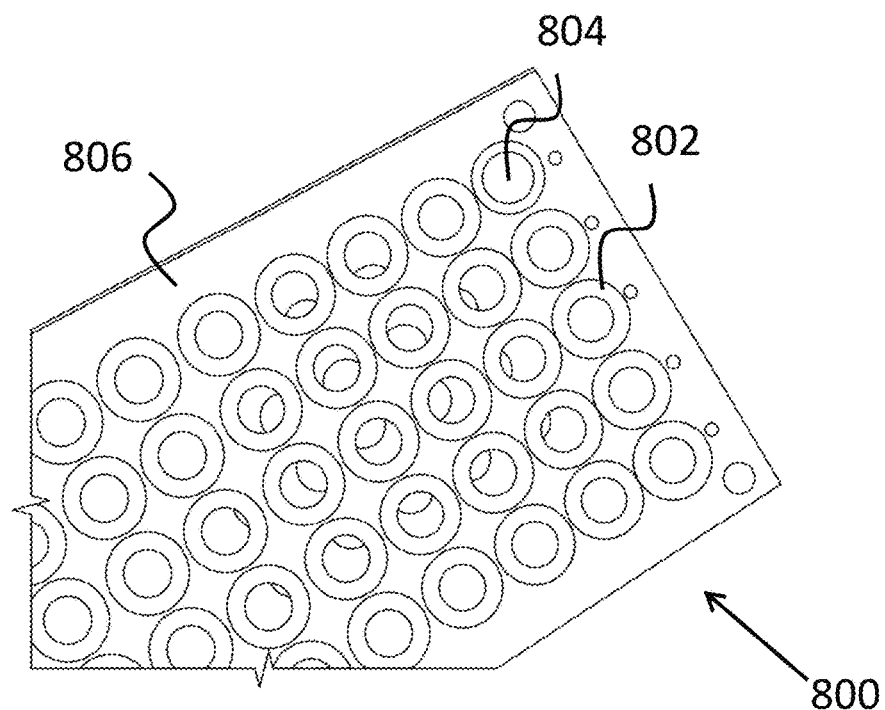
FIG. 8 is a schematic illustration of a bottom surface of a cell plate further showing O-rings that can be used to facilitate coupling the cell plate to a surface of a second electrode so as to prevent leaking of any electrolyte included within cells of the cell plate.

An exemplary cell plate is shown in FIG. 7. As shown in FIG. 7, cell plate 700 comprises a plurality of cells 702. As also shown in FIG. 8, cell plate 800 can further be associated with an O-ring 802 at an end of each cell 804, typically the end of the cell that meets surface 806, which contacts a surface of a second electrode (not illustrated). In an independent aspect of the disclosure, the second electrode is not contained within any cell of the cell plate.

The electrochemical characterization apparatus further comprises a second electrode containment component. The second electrode containment component is designed to hold the second electrode (or plurality of second electrodes) and provide easy implementation of the second electrode (or plurality thereof) into a system (e.g., integration with a robotic or manual sampling platform). In particular aspects of the disclosure, the second electrode containment component can be used to align the second electrode (or plurality of second electrodes) with a cell plate used in conjunction with the electrochemical characterization apparatus. The second electrode containment component typically comprises an opening into which the second electrode (or plurality of second electrodes) can be positioned. The second electrode containment component typically does not fully enclose the second electrode and instead allows at least one surface of the second electrode to contact the cell plate such that electrolytes or other materials contained within individual cells of the cell plate can physically contact the surface of the second electrode. In an independent aspect of the disclosure, the second electrode containment component is free of any electrolyte prior to and/or during use of the electrochemical characterization apparatus (or any system disclosed herein). The second electrode containment component can be made of any suitable material for holding the second electrode, and typically is selected from a material that does not interfere with the second electrode's performance during use of the system. In some aspects of the disclosure, the second electrode containment component can be made of a metal material, polymer material, or a combination thereof. The second electrode containment component can have any shape or size suitable for holding the second electrode in a fixed position and that can be physically coupled with a cell plate so as to form a point of contact that ensures no liquid present in cells of the cell plate leaks from the cell plate.

In some aspects of the disclosure, the second electrode containment component has a shape and size that matches the shape and size of the cell plate. In representative aspects of the disclosure, the second electrode containment component has a rectangular or square shape. The second electrode containment component may further comprise one or more openings configured to accept a fastening component and/or one or more clamps that can be used to maintain contact and/or alignment between the second electrode containment component and the cell plate.

Figure 9A:
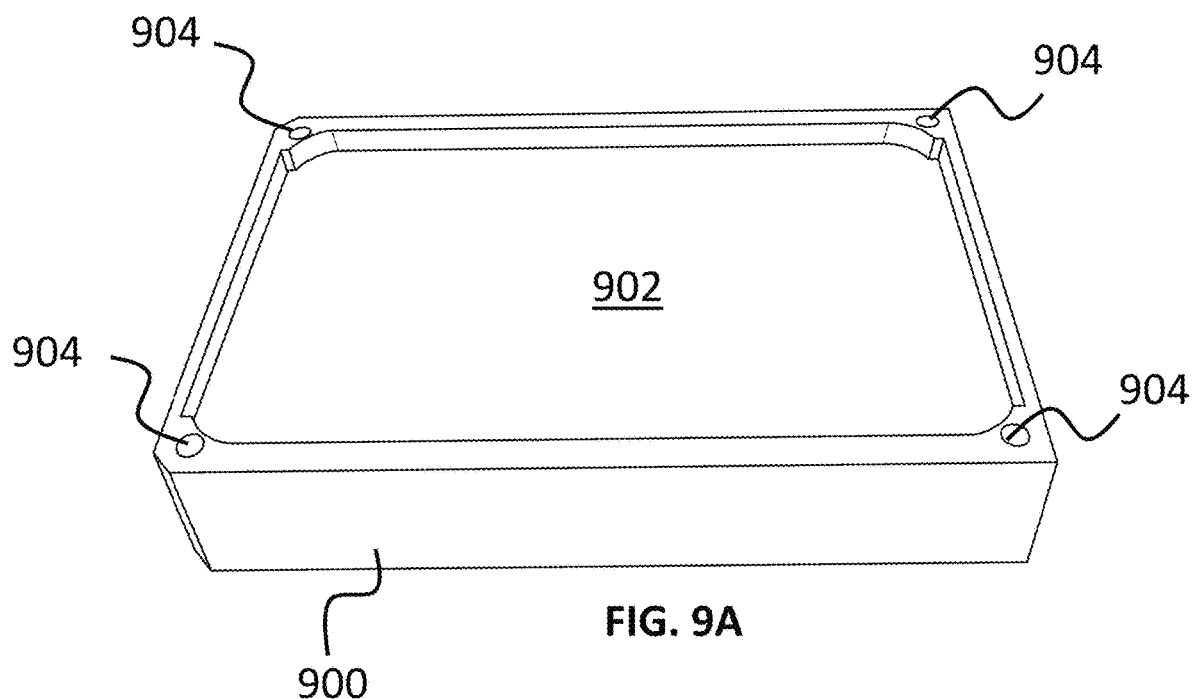
Figure 9B:
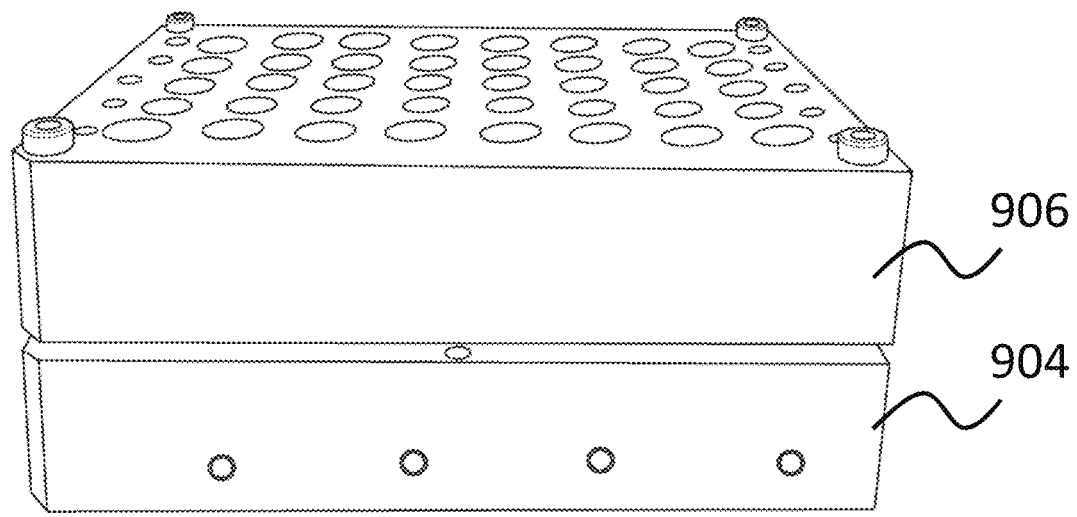

An exemplary second electrode containment component of the disclosure is illustrated in FIGS. 9A and 9B. As shown in FIG. 9A, second electrode containment component 900 can have a rectangular shape and contains opening 902 that is configured to accept a second electrode (or plurality of second electrodes) (not shown). Second electrode containment component 900 can further comprise a plurality of openings 904 that facilitate physically coupling it to cell plate 906 as shown in FIG. 9B. FIGS. 2A and 2B also illustrate (i) a second electrode containment component 204 in which a single second electrode is contained, and (ii) a second electrode containment component 204 in which a plurality of second electrodes is contained, respectively.

Figure 10:
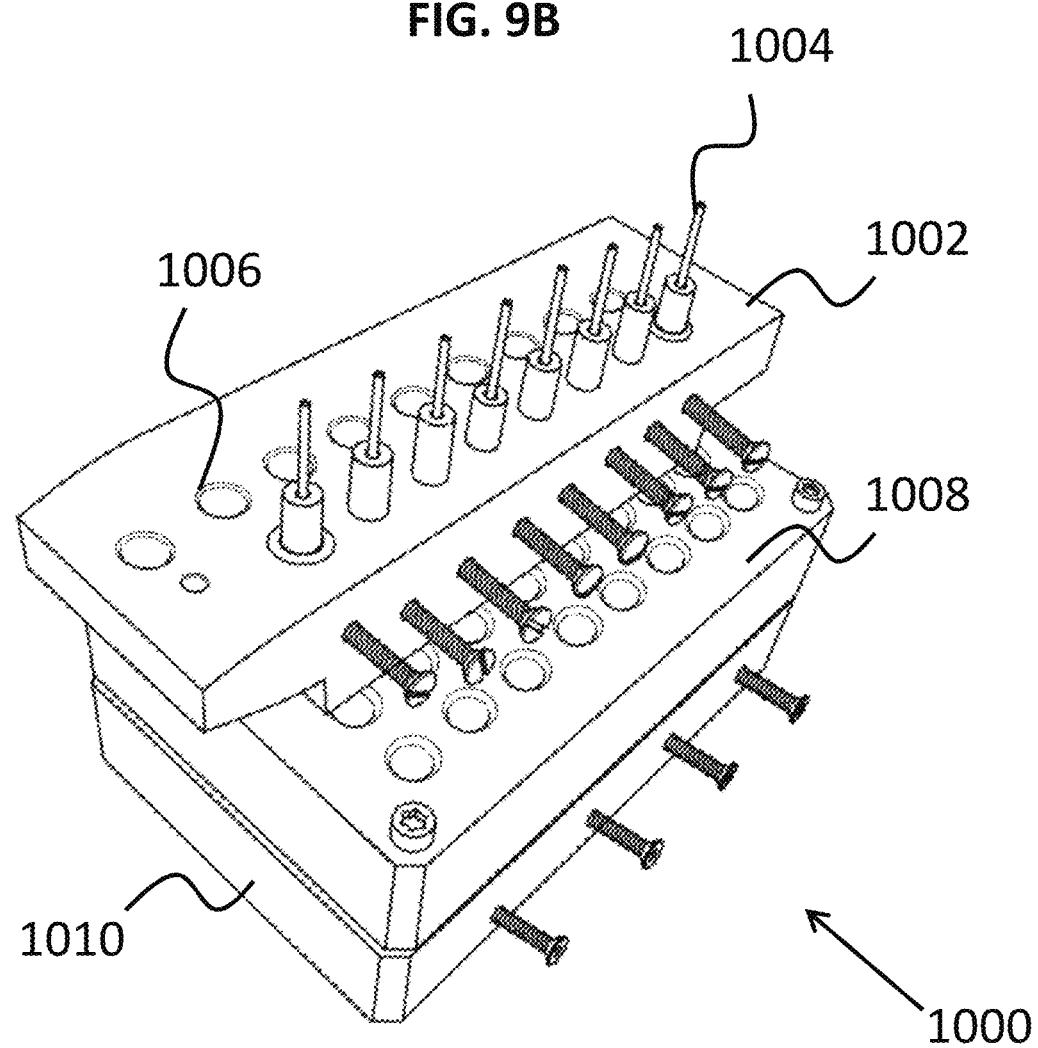
FIG. 10 is a schematic illustration of an assembled electrochemical characterization apparatus comprising a first apparatus portion (comprising a holder component and a plurality of first electrodes) coupled to a second apparatus portion (comprising the second electrode, second electrode containment component, and a cell plate).
Figure 11:
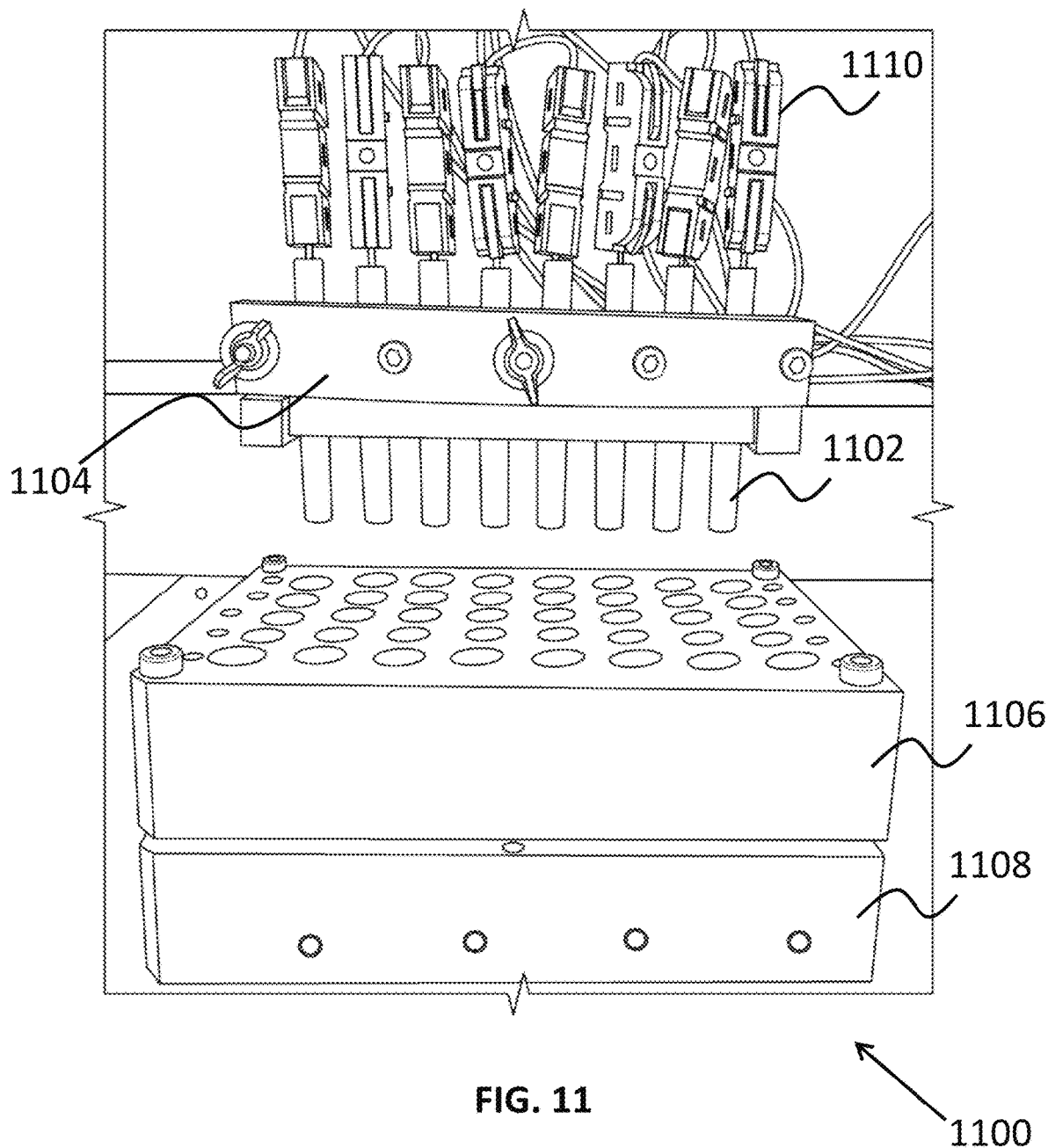
FIG. 11 is a schematic illustration of components of an electrochemical characterization system comprising the first and second apparatus portions of FIG. 10 and further showing measurement devices coupled to the first electrodes.

In some aspects of the disclosure, the electrochemical characterization apparatus comprises the first electrode and the holder component (and any reference electrode, if used), which are associated as a first apparatus portion and further comprises the second electrode and the second electrode containment component, which are associated as a second apparatus portion. In yet additional aspects of the disclosure, the apparatus can further comprise the cell plate that is physically coupled with the second electrode and/or the second electrode containment component. The first and second apparatus portions are used in conjunction with one another during operation of the electrochemical characterization apparatus but need not be physically coupled with one another throughout the entire time of operation. Solely by way of example, the first apparatus portion can become ionically associated with the second apparatus portion during operation when the first electrode is exposed to an electrolyte that is in contact with the second electrode. A representative example of a constructed apparatus (1000) is shown in FIG. 10, which comprises holder component 1002 that holds a plurality of first electrodes 1004 within openings 1006. Holder component 1002 is used to align first electrodes 1004 with cells of cell plate 1008, which is positioned on a surface of a second electrode (not shown) that is contained in second electrode containment component 1010.

Also disclosed herein is an electrochemical characterization system. The system comprises an electrochemical characterization apparatus as described herein, along with a cell plate that is physically coupled with the second apparatus portion of the electrochemical characterization apparatus. The system also comprises a robotic and/or manual sampling platform. For example, in some aspects, the robotic sampling platform can comprise a robotic arm or other controlling mechanism suitable for moving the holder component comprising the first electrode during use of the system. In yet other aspects, such control can be performed manually. In some aspects, a robotic arm/controlling mechanism can be part of an already existing robotic sampling platform that is adapted for use with the disclosed electrochemical characterization apparatus. Solely by way of example, the robotic arm can be a component of an HTP array system that might be used for biological testing (or other types of automated platform testing), but where such components can be integrated with the apparatus components discussed herein. In particular aspects, the cell plate is capable of being physically coupled with the second electrode and/or the second electrode containment component. The cell plate is positioned on top of the second electrode, which is contained within the second electrode containment component, such that a bottom surface of the cell plate (which typically is a discontinuous surface) is in physical contact with a top surface of the second electrode. The cell plate may further be physically coupled with the second electrode containment component but need not be. In some other aspects of the disclosure, the cell plate can be physically coupled with the second electrode and/or the second electrode containment component such that they form an integrated structure.

In yet additional aspects of the disclosure, the system can further comprise a dispensing device that can be used to introduce an electrolyte into cells of the cell plate. In some aspects of the disclosure, the dispensing device can be part of the robotic sampling platform and can be a nozzle, tube, pipette, or other mechanism for placing the electrolyte into one or more cells of the cell plate. The electrolyte can be included in the cell plate prior to use or it can be added to the cells of the cell plate during use using the dispensing device. In such aspects, the electrolyte is contained within walls of the cells and contacts the top surface of the second electrode. The first apparatus portion of the electrochemical characterization apparatus can then be operated such that the first electrode can be exposed to the electrolyte contained within the cells by placing the first electrode into a depth of a cell of the cell plate using the holder component. A robotic arm or other controlling mechanism of a robotic or manual sampling platform can be used to facilitate placing the first electrode in the cell by moving the holder component as needed to align the first electrode with a cell of cell plate, or to align a plurality of first electrodes with multiple distinct cells such that each first electrode independently contacts electrolyte within individual cells.

The system may further comprise one or more measurement devices that can be used in combination with the other components of the system to measure performance of, for example, the electrolyte, the first electrode, and/or the second electrode. The measurement device can be electrically coupled with one or more components of the apparatus and/or system, including the first electrode, the second electrode or any combination and/or plurality thereof. The measuring devices can be integrated with a component of the system or it can be a separate component that becomes coupled to the system prior to or during use. In some aspects of the disclosure, the measuring device can be contained within a cell of the cell plate, attached to the first electrode, attached to the second electrode, attached to the holder component, and/or attached to the second electrode containment component. In some aspects of the disclosure, the measurement device can be potentiostat, a galvanostat, an electrochemical interface, or other suitable device capable of measuring changes in conductivity, impedance, ion transfer, CV, or the like. In particular aspects of the disclosure, the measurement device is a multichannel potentiostat, or a plurality thereof. FIG. 10 illustrates exemplary system setup 1000 comprising first electrodes 1004 in holder component 1002, cell plate 1006 that is positioned on a surface of a second electrode (not shown), which is held within second electrode containment component 1008, and a plurality of measurement devices 1010. Other components of the system, such as a robotic sampling platform including a robotic arm, are not illustrated.

In yet additional aspects of the disclosure, the system can comprise a power source. The power source can be electrically coupled to components of the system and/or apparatus to facilitate movement of the holder component, charge/discharge cycles, or the like.

Methods

Also disclosed herein is a method for using the disclosed electrochemical characterization apparatus and system. The method can include using the electrochemical characterization apparatus/system to analyze performance of one or more electrodes (including electroactive materials of such electrodes), an electrolyte, or a combination of one or more electrodes and electrolytes (such as fuel cell/battery performance). Performance of these components can be evaluated to determine whether the components exhibit properties desirable for energy storage and/or to provide a library of data for use in evaluating and/or selecting component materials for energy applications (e.g., in machine learning and/or validating prediction models). Without being limited to a specific list of measurable performance parameters, the method can involve evaluating whether suitable electrode/electrolyte pairings are viable combinations for a particular energy storage and conversion device (e.g., battery, electrochemical cell, or the like), whether a particular electroactive material is desirable for use in an energy storage and conversion device, whether a particular electrolyte exhibits desirable ion transfer for use in an energy storage and conversion device, or any combination thereof. In particular aspects of the disclosure, the method can comprise using the disclosed apparatus and/or system to conduct EIS analysis, CV measurement, coulombic efficiency measurement, electrolyte conductivity measurement, or the like.

The disclosed method can comprise providing an electrochemical characterization apparatus or system according to the present disclosure and adding an electrolyte into cells of the cell plate. A robotic or manual sampling platform of the system can be used to control movement of the holder component of the electrochemical characterization apparatus such that the first electrode, or the plurality thereof, is disposed into (or contacts) the electrolyte contained within individual cells of the cell plate. The method further comprises performing one or more charge and discharge cycles with the system using a power source to apply an electrical charge to the plurality of first electrodes and measuring a performance of the electrolyte, the plurality of first electrodes, or the second electrode during the charge and discharge cycles. The performance of the electrolyte, the plurality of first electrodes, or the second electrode during the charge and discharge cycles can be measured using electrochemical impedance spectroscopy, an electronic conductivity measurement technique, a coulombic efficiency measurement technique, or an ion transfer measurement technique. In some aspects of the disclosure, adding the electrolyte comprises adding a plurality of different electrolytes into the cells such that each cell of the plurality of cells contains a different electrolyte. In some aspects of the disclosure, the method can comprise analyzing performance of components associated with each cell (e.g., a first electrode, the second electrode, and/or any electrolyte contained therein) in sequence or in parallel.

In one exemplary method, the electrochemical characterization apparatus can be coupled with other system components described (e.g., a robotic and/or manual sampling platform) herein to evaluate whether an electrolyte exhibits desirable properties that would lend to its use in an energy storage and conversion device. For example, different electrolyte compositions can be added to different cells of a cell plate that is, or that can be, coupled with the second electrode. The first electrode can be exposed to the electrolyte by dipping it into a cell containing the electrolyte using the holder component, which can be operated manually or using a robotic arm (or other controlling mechanism). Electrochemical screening can then be conducted using the system by connecting the electrodes of the system to a suitable measurement device and/or electrochemical interface. Performance of the electrolyte during electrochemical screening can then be measured and evaluated to determine if the electrolyte provides desirable performance for use in an energy storage and conversion device, such as sufficient ion transfer between electrodes. In certain aspects, a plurality of different electrolytes can be tested simultaneously by including different electrolytes within different cells of the cell plate and then exposing individual first electrodes of a plurality contained within the holder component into the cells such that each individual electrode of the plurality is disposed in one cell comprising a unique electrolyte. In such aspects, the first electrodes of the plurality can be made of the same or different materials.

In yet another exemplary method, the electrochemical characterization apparatus can be coupled with other system components described herein to evaluate whether a first electrode exhibits desirable properties that would lend to its use in an energy storage and conversion device. For example, the holder component can be configured to hold a plurality of first electrodes wherein each electrode of the plurality is different (e.g., includes a different electroactive material, a different electroactive material loading amount, a different thickness, a different shape and/or size, or the like). Each of the first electrodes can then be disposed into an electrolyte contained within cells of the cell plate. Electrochemical screening can be conducted using the system and performance of each individual electrode can be measured. Results from these measurements can then be used to determine whether the electrodes of the plurality are suitable for use in an energy storage and conversion device.

In yet another exemplary method, the electrochemical characterization apparatus can be coupled with other system components described herein to evaluate whether a second electrode exhibits desirable properties that would lend to its use in an energy storage and conversion device. For example, the second electrode containment component can be configured to hold a second electrode, or a plurality of individual second electrodes. If a plurality of second electrodes is used, each second electrode of the plurality can be different (includes a different electroactive material, a different electroactive material loading amount, a different thickness, a different shape and/or size, or the like). Each of the second electrodes (or any single second electrode) can then be used in combination with an electrolyte disposed within cells of a cell plate that is coupled to the second electrode and/or the second electrode containment component. Electrochemical screening can be conducted using the apparatus/system and performance of the second electrode (or individual performance of individual second electrodes making up a plurality) can be measured. Results from these measurements can then be used to determine whether the second electrode (or any individual electrode of a plurality) are suitable for use in an energy storage and conversion device.

In a representative aspect of the disclosure, the electrochemical apparatus and system was used to conduct EIS screening of various electrolytes to evaluate their ion transport properties. In yet another representative aspect of the disclosure, the electrochemical apparatus and system was used to conduct cyclic voltammetry screening of different redox species present in electrolytes to evaluate redox potentials of such species and/or electrochemical stability windows for such species.

In any of the methods described herein, multiple measurements, such as conductivity measurements, can be obtained and averaged for each different modified parameter (e.g., varied electrolytes, first electrodes, and/or second electrodes). The method can further comprise utilizing averaged data (e.g., average resistance data) to create a calibration curve that can be used as a reference for additional measurements, such as additional conductivity measurements.

In yet additional aspects of the disclosure, certain design characteristics of the apparatus and/or system components can be tuned or controlled. Solely by way of example, the first electrode can be designed to have a fixed diameter (e.g., if a plurality of first electrodes is used, each electrode of the plurality can have the same diameter). Additionally, or alternatively, the distance between the first and second electrode can be controlled such that the same distance is maintained for each electrode of any plurality (e.g., plurality of first electrodes and/or a plurality of second electrodes). The fixed distance between the first and second electrodes can be modified as needed for any particular analysis conducted with the apparatus/system. In particular aspects of the disclosure, the distance can be controlled to tune any impedance response observed when using the apparatus/system. Control of such parameters can be carried out to promote reliable and reproducible measurements using the apparatus/system.

OVERVIEW OF SEVERAL EMBODIMENTS

Disclosed herein are embodiments of an electrochemical characterization apparatus, comprising: an electrode pair comprising (i) a first electrode, or a plurality thereof; and (ii) a second electrode selected from a unitary second electrode or a plurality of second electrodes; a holder component comprising an electrode-accepting unit that is physically coupled with the first electrode, or a plurality of electrode-accepting units that are, independently, physically coupled with individual first electrodes of the plurality of first electrodes; and a second electrode containment component comprising an opening that holds the second electrode, wherein the opening is free from any electrolyte prior to or during use.

In any or all of the above embodiments, (i) the electrode-accepting unit comprises an opening within the holder component and wherein the first electrode is held within the opening; or (ii) a plurality of electrode-accepting units is present and is a plurality of openings within the holder component and wherein individual first electrodes of the plurality of first electrodes are held within individual openings of the plurality of openings.

In any or all of the above embodiments, the apparatus comprises the plurality of first electrodes and each first electrode of the plurality is different from other electrodes of the plurality of first electrodes.

In any or all of the above embodiments, the first electrode is a working electrode.

In any or all of the above embodiments, the apparatus further comprises a reference electrode, or a plurality thereof, wherein the reference electrode is, or the plurality thereof are, held by the holder component.

In any or all of the above embodiments, the second electrode is the unitary second electrode and wherein the unitary second electrode is contained in the opening of the second electrode containment component.

In any or all of the above embodiments, the second electrode is the plurality of second electrodes and wherein individual electrodes of the plurality of second electrodes are contained within the opening of the second electrode containment component and are separated from any adjacent electrode of the plurality of second electrodes by a void space or a separator, or wherein individual electrodes of the plurality of second electrodes physically touch any adjacent second electrode.

In any or all of the above embodiments, second electrode is a counter electrode.

In any or all of the above embodiments, the apparatus further comprises a cell plate that is positioned on a top surface of the second electrode and wherein the cell plate comprises a plurality of cells.

In any or all of the above embodiments, each cell of the plurality of cells has (i) a first opening that allows an electrolyte deposited therein to physically contact the second electrode when the cell plate is positioned on the top surface of the second electrode and (ii) a second opening that allows the electrolyte to physically contact the first electrode or individual electrodes of the plurality of first electrodes.

In any or all of the above embodiments, the cell plate further comprises O-rings positioned at the first opening of each cell of the plurality of cells, wherein the O-rings physically touch the top surface of the second electrode.

In any or all of the above embodiments, the apparatus further comprises an electrolyte contained within the plurality of cells, wherein the electrolyte contacts the top surface of the second electrode.

In any or all of the above embodiments, the apparatus further comprises one or more measurement devices electrically coupled to the first electrode or the plurality thereof.

Also disclosed herein are embodiments of a system, comprising: an electrochemical characterization apparatus according to any or all of the above embodiments; a cell plate comprising a plurality of cells, wherein the cell plate is positioned on a top surface of the second electrode; a robotic or manual sampling platform; and a measurement device; a dispensing device; a reference electrode, or plurality thereof; a power source; or a combination thereof.

In any or all of the above embodiments, the robotic or manual sampling platform is used to control movement of the holder component and the first electrode, or the plurality thereof, such that the first electrode is, or individual first electrodes of the plurality of first electrodes are, disposed within individual cells of the cell plate.

In any or all of the above embodiments, the system comprises the measurement device and the measurement device comprises one or more potentiostats electrically coupled to first electrode or individual electrodes of the plurality of first electrodes.

In any or all of the above embodiments, the system comprises the electrolyte dispensing device and the electrolyte dispensing device is used to add an electrolyte to cells of the cell plate.

Also disclosed herein are embodiments of a method for conducting electrochemical characterization, comprising: providing a system according to any or all of the above embodiments; adding an electrolyte into cells of the cell plate; using the robotic or manual sampling platform to control movement of the holder component of the electrochemical characterization apparatus such that the first electrode is, or the plurality thereof are, disposed into the electrolyte contained within individual cells of the cell plate; performing electrochemical screening with the system; and measuring a performance of the electrolyte, the plurality of first electrodes, or the second electrode during the electrochemical screening.

In any or all of the above embodiments, the performance of the electrolyte, the plurality of first electrodes, or the second electrode during the electrochemical screening is measured using electrochemical impedance spectroscopy, an electronic conductivity measurement technique, a coulombic efficiency measurement technique, or an ion transfer measurement technique.

In any or all of the above embodiments, adding the electrolyte comprises adding a plurality of different electrolytes into the cells such that each cell of the plurality of cells contains a different electrolyte.

EXAMPLES

All chemicals were purchased from Sigma-Aldrich and Fisher Scientific and used as received from commercial suppliers. Deionized water (DI water) was purified using the Millipore water purification system with a minimum resistivity of 18.2 MΩ·cm. The electrolytes were prepared using deionized water and were purged with nitrogen prior to use. Phenazine and fluorenone derivatives were prepared using techniques known in the art. The Multichannel potentiostats/galvanostats were obtained from Autolab (M204).

The robotic platform was employed for automated sampling under the guidance of Laboratory Execution and Analysis Software. To control the measurements and gather data, a robotic arm operated in conjunction with an 8-channel potentiostat was used. The electrodes of the HTP electrochemical device were electrically linked to the 8-channel potentiostat (Autolab) for executing electrochemical measurements.

The working and Ag/AgCl reference electrodes utilized in these examples were sourced from CH Instruments, while the bottom electrode was fabricated at Pacific Northwest National Laboratory (PNNL). Unless otherwise specified, a glassy carbon served as the working electrode (WE), and graphite was employed as both the counter electrode (CE) and the reference electrode (RE). The glassy carbon WE had diameters of 3 mm, 1.6 mm, and 1 mm throughout this work, while the platinum WE had a diameter of 2 mm. The EIS and cyclic voltammetry (CV) techniques were conducted using a multi-channel electrochemical interface (Autolab, M204), which was connected to the electrodes within the electrochemical cell. This interface measured the relative potential between the WE and the RE, as well as the current flowing between the WE and the CE.

Example 1

Figure 12A:
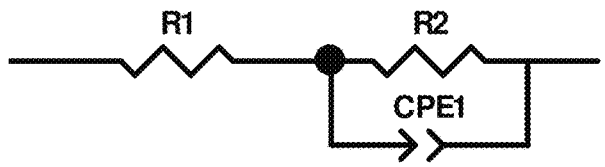
Figure 12B:
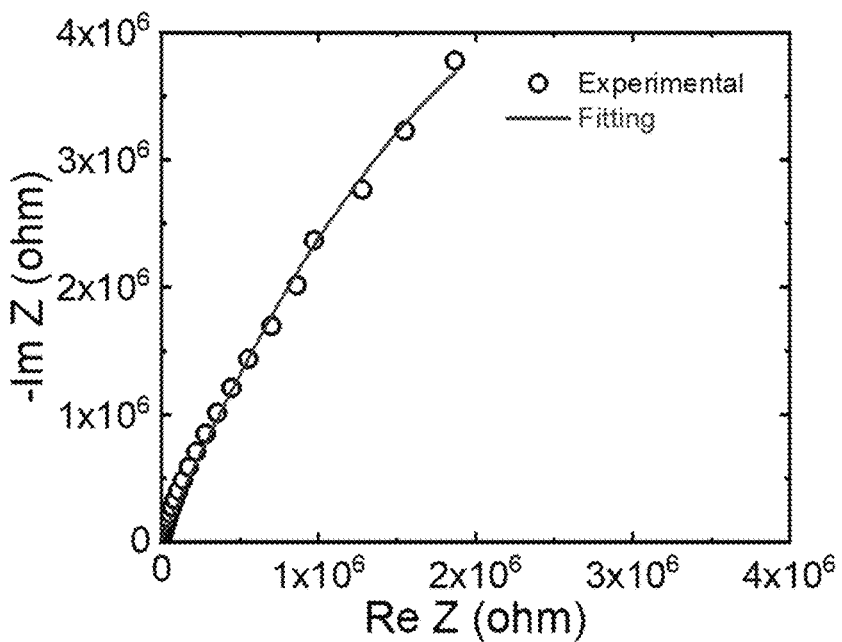
Figure 12C:
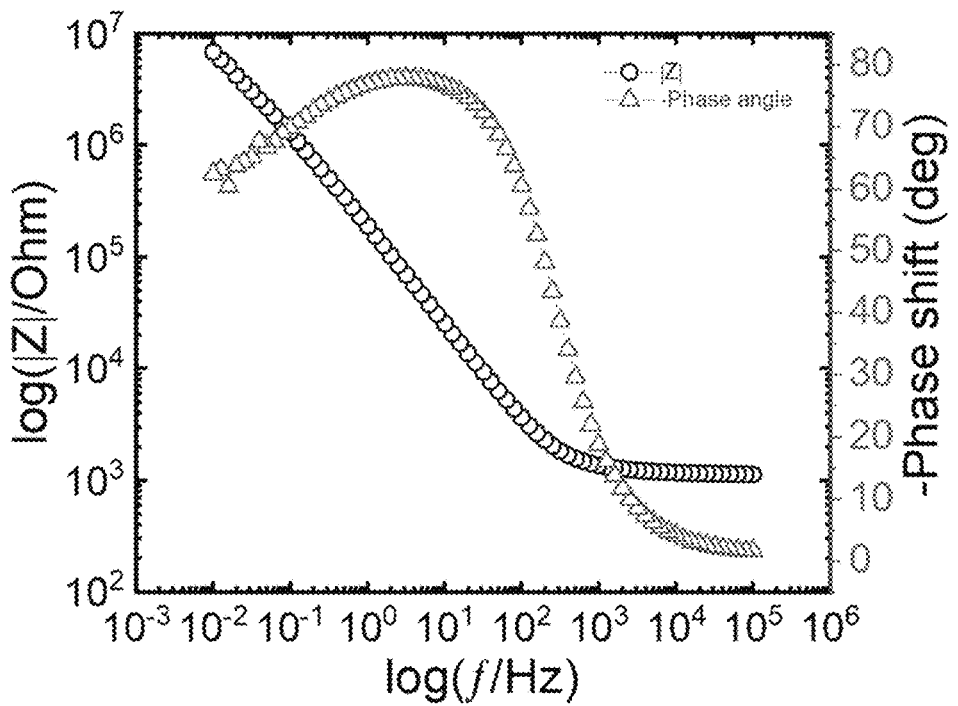

Two-electrode electrochemical impedance spectroscopy (EIS) measurements are commonly employed due to their simplicity and direct applicability to materials, cells, or packs without requiring modifications. For example, the ionic conductivity is routinely determined by conducting EIS on a 2-electrode cell with symmetric ion-blocking electrodes. In this example, two-probe EIS measurements were performed using the system. The impedance data was then analyzed by fitting it to a simplified Randles circuit illustrated in FIG. 12A. This model circuit comprised a total ohmic resistance (R1), a charge transfer resistance (R2), and a constant phase element (CPE1). Varying the applied frequency in an EIS measurement provided helpful information. To comprehensively represent this complex dataset, two graphs were employed: the Nyquist plot and the Bode plot (FIGS. 12B and 12C, respectively). In the Nyquist plot, a representative impedance spectrum (FIG. 12B) exhibits characteristic features of an electrochemical device with two ion-blocking and inert electrodes. The intercept on the real part axis at high frequency corresponds to R1, while a large and depressed arc in the medium to low frequency range represents the electrode response. Additional insights can be gleaned from the Bode plot, which displays $|Z(\omega)|$ and $\phi$ as functions of frequency. This relationship can be observed in $|Z(\omega)|$ vs. f (FIG. 12C): a plateau followed by a negative slope corresponds to the depressed arc observed in the Nyquist plot, while $\phi$ vs. f reveals minimum absolute phase angle values that align with the plateau in $|Z(\omega)|$ vs. f. These observations align with the characteristic electrical response of a model Randles cell, where the ion conduction electrolyte is sandwiched between ion-blocking electrodes.

Figure 13A:
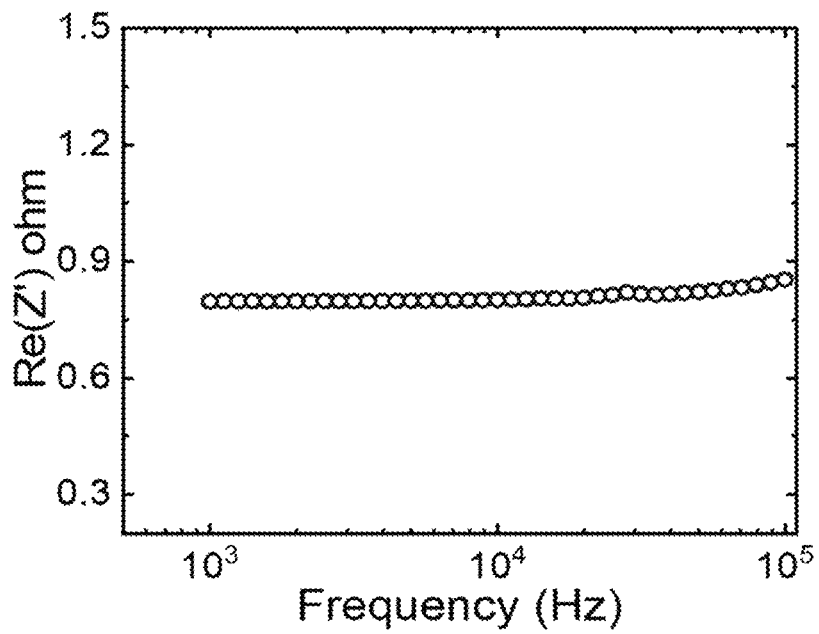
Figure 13B:
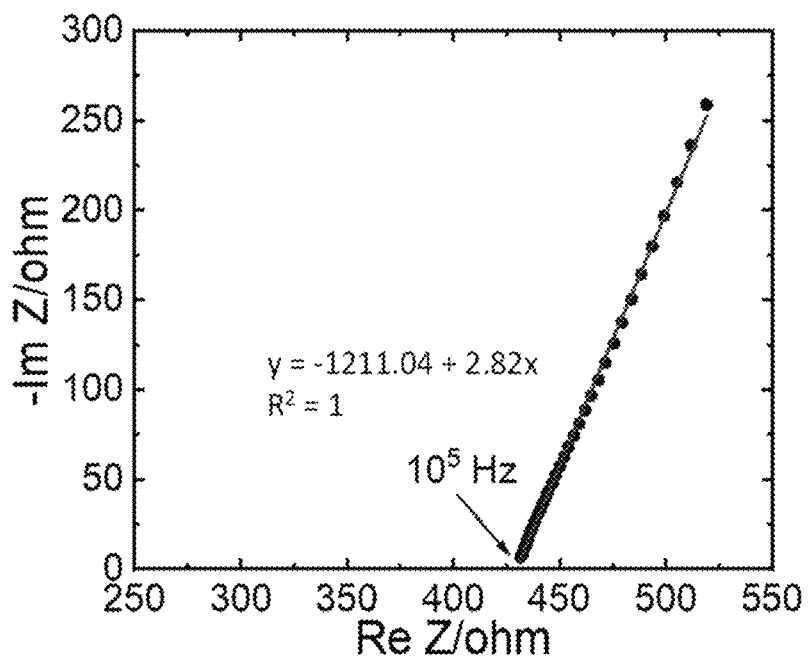

R1 encompasses the combined background resistance originating from both electrodes and the spreading resistance from the electrolyte. For this example, the background resistance can be disregarded as it is negligible when compared to the electrolyte resistance (FIG. 13A). Consequently, R1 is utilized to represent the spreading resistance of the electrolytes. When analyzing the Bode plot, it was observed that the frequency range of 1000 Hz to 100 kHz corresponds to a small (non-zero) absolute phase angle value and a plateau of $|Z(\omega)|$. This allowed performing linear fitting to determine the intercept on the real part axis at high frequency for R1 (FIG. 13B). Alternatively, a Python code can be programmed to extract the absolute phase angle values from a frequency range of 1M or $10^5$ to 1000 Hz, selecting three minimum angles, and then averaging their corresponding real part of the impedances to obtain the resistance of the sample (R1).

The resistance of a liquid electrolyte depends on the ionic concentration, type of ions, temperature, and geometry of the current-carrying area. In a bounded region of area (A) and length (l) passing on a uniform current, the resistance is defined as follows in Equation (1):

$$R = \rho l/A \qquad \text{Equation (1)}$$

Figure 14A:
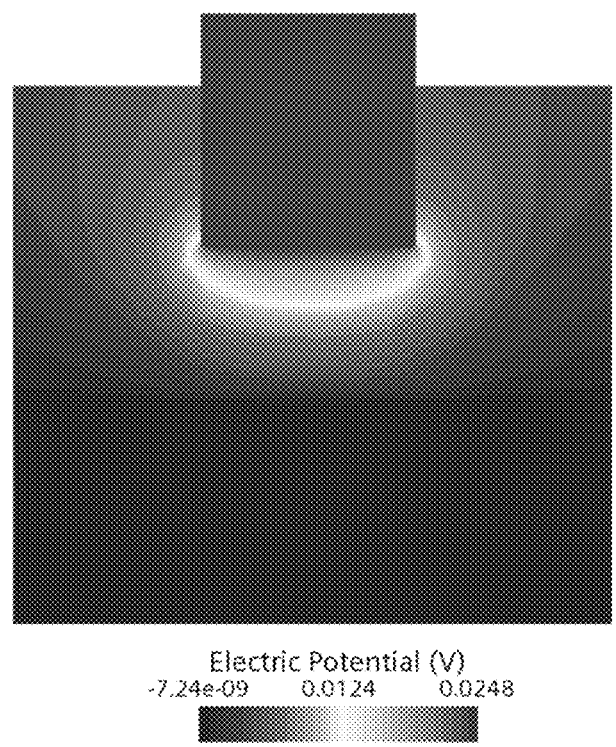

Simcenter STAR-CCM+ was used to simulate the current distribution between the top and bottom electrodes. In FIG. 14A, the resulting current distribution is illustrated, which is influenced by both the diameter of the top electrode (d) and the distance between the top and bottom electrodes (H). Notably, the H/d ratio does not approach zero or infinity, precluding the use of simple equations to calculate the conductivity from the measured resistance.

Figure 14B:
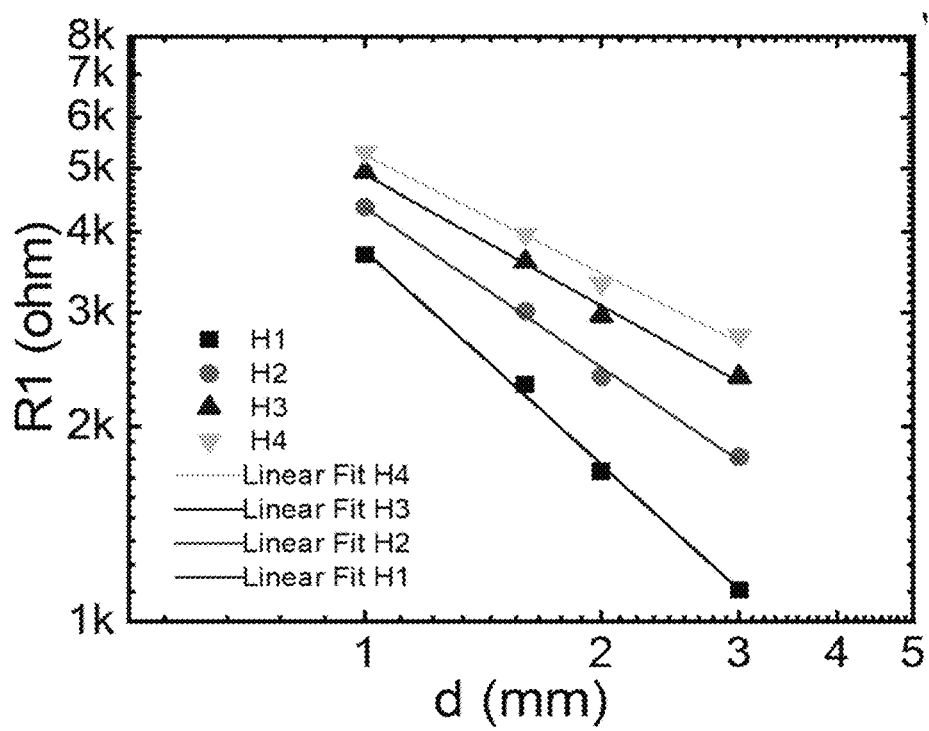

In order to ensure accurate conductivity measurements, a systematic study was conducted to examine the impact of the diameter of top electrodes and the distance between top and bottom electrodes on the measured resistance. To explore the effect of top electrode diameter on the impedance response, the resistance was measured using top electrodes with diameters ranging from 1 mm to 3 mm (as depicted in FIG. 14B). The results, displayed on double-logarithmic plots, revealed a proportional relationship between the resistance and the inverse of the electrode diameter, with varying slopes depending on the distance (H) between top and bottom electrodes.

Figure 14C:
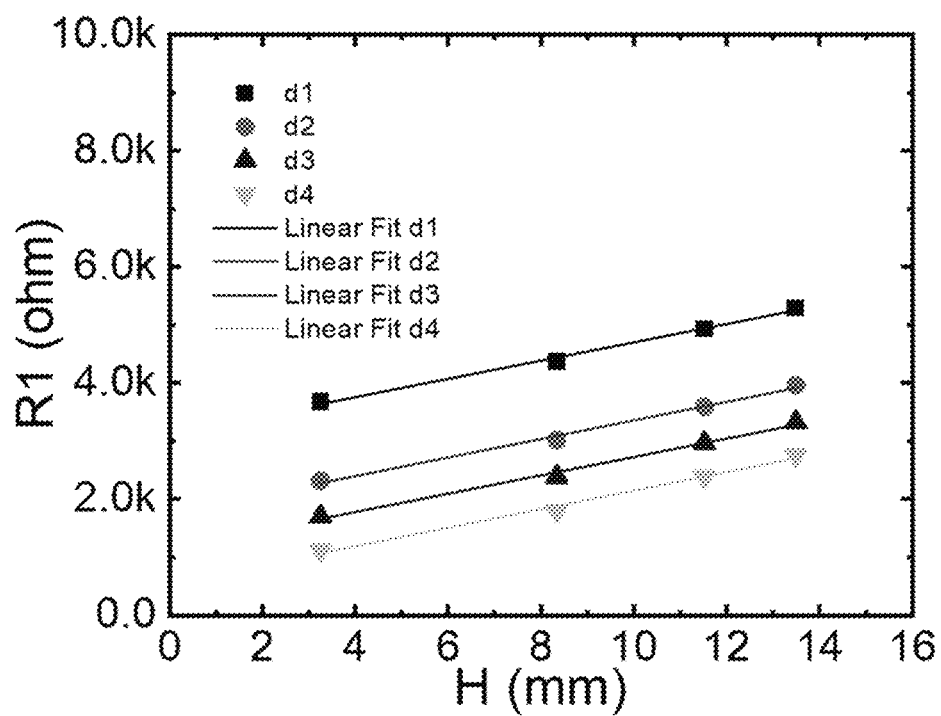

Furthermore, the distance's effect on resistance exhibited a clear linear relationship (as seen in FIG. 14C), showcasing the uniform cell geometry feature and ensuring precise measurements. Interestingly, and regardless of the different diameters of the top electrode, all the lines remained parallel, indicating similar slopes.

In many electrochemical cells, the current distribution through the liquid electrolyte is not uniform. However, the results of this example demonstrate the feasibility of extracting a constant cell geometry factor by using a fixed diameter for the top electrode and a fixed distance between the top and bottom electrodes. This approach can facilitate reliable and repeatable conductivity measurements.

Example 2

A standard calibration curve was established using four conductivity standard solutions, spanning a range from 1 ms/cm to 100 ms/cm. The measurements were conducted using a diameter (d) of 3 mm and a distance (H) of 3.25 mm with the electrochemical characterization apparatus. To ensure fast and precise sampling, the apparatus was seamlessly integrated with a robotic platform to provide an electrochemical characterization system.

Figure 15:
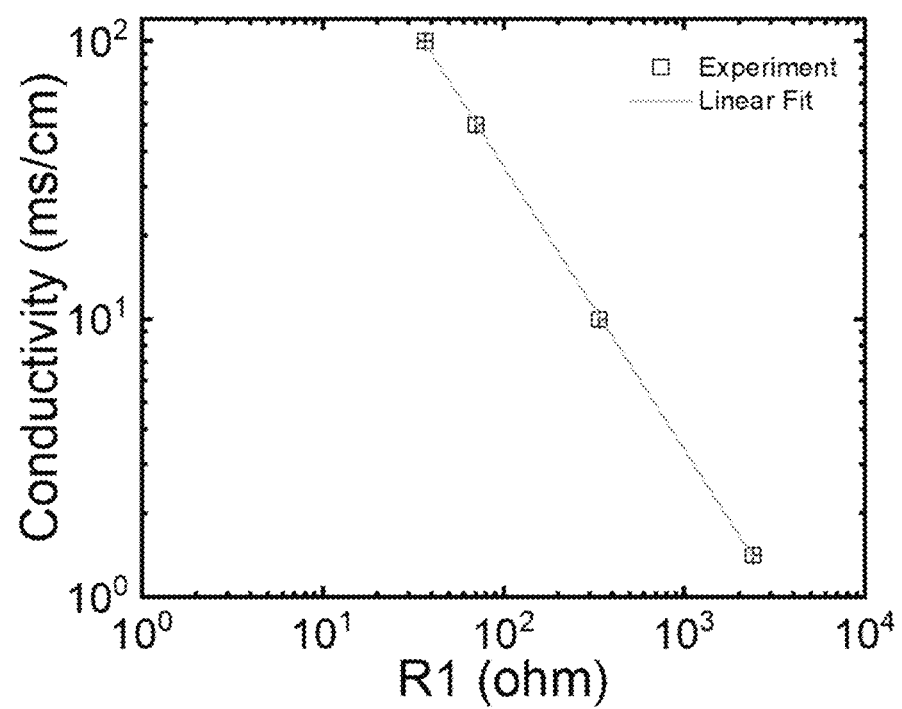
FIG. 15 is a graph showing the standard calibration curve for conductivity measurements conducted using an electrochemical characterization apparatus/system.

Each standard solution underwent 40 measurements across the entire plate. From these measurements, the average resistance was calculated, with an associated error bar of approximately 3-4%. This average resistance data was then utilized to create the calibration curve, as depicted in FIG. 15. The resulting calibration curve serves as a reliable reference for subsequent conductivity measurements.

Example 3

Figure 16:
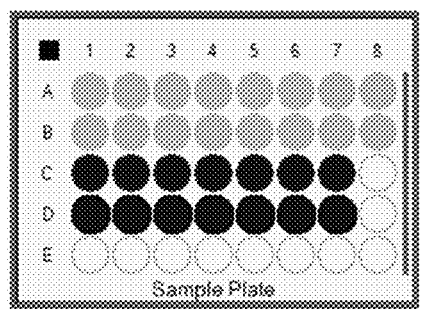
FIG. 16 shows a schematic diagram of cells of a cell plate which shows how different electrolytes can be included in individual cells so as to measure different performance parameters.

To showcase the true potential of a disclosed system in testing redox flow battery (RFB) electrolytes, an electrochemical characterization apparatus and system was utilized in combination with an evaluation focused on obtaining accurate conductivity measurements. Conducting such an evaluation with a conventional commercial conductivity meter results in inaccurate readings (likely due to the presence of strong bases and high conductivity values, coupled with limited sample volumes). Additionally, the RFB electrolytes comprised a complex mixture of solvents, combining dimethyl sulfoxide (DMSO) and water, which is another aspect that causes problems for conventional conductivity meters. Leveraging the capabilities of the disclosed apparatus/system, these obstacles were successfully overcome and precise conductivity data for the RFB electrolytes was obtained using the layout of cells/electrolytes as shown in FIG. 16. Results are summarized in Table 1, below, wherein the average R values for L1-L8 (8 samples) were obtained by analyzing cells A1-A8 and B1-B8 (duplicate samples), then conductive values were obtained from the calibration curve, wherein these two rows of cells included a phenazine derivative-based electrolyte; and the average R values for F1-F7 were obtained by analyzing cells C1-C7 and D1-D7, then conductive values were obtained from the calibration curve, wherein these two rows of cells included a fluorenone derivative-based electrolyte. This example demonstrates the apparatus and system's efficacy in handling demanding electrochemical analyses. This achievement holds promising implications for the advancement of RFB technology and opens new possibilities for optimizing energy storage systems.

| Sample | Average R (ohm) | Conductivity (ms/cm) |
| --- | --- | --- |
| L1 | 95.59 | 37.14 |
| L2 | 98.08 | 36.18 |
| L3 | 96.47 | 36.79 |
| L4 | 98.28 | 36.1 |
| L5 | 97.08 | 36.56 |
| L6 | 100.87 | 35.16 |
| L7 | 100.42 | 35.32 |
| L8 | 100.33 | 35.35 |
| F1 | 46.88 | 76.77 |
| F2 | 42.38 | 85.08 |
| F3 | 45.8 | 78.61 |
| F4 | 46.23 | 77.86 |
| F5 | 52.24 | 68.74 |
| F6 | 48.31 | 74.45 |
| F7 | 45.83 | 78.55 |

A Teflon cell plate comprising 40 individual compartments arranged in a 5×8 configuration was utilized, enabling simultaneous loading of a comprehensive sample matrix of solvents. Each cell was specially designed to accommodate a sample volume of 200 µL. To facilitate rapid and sequential testing, a custom 3D-printed holder component was employed, allowing for the insertion of eight sets of first electrodes (which included working and reference electrodes (Ag/AgCl)) into the multicell system. All electrochemical measurements utilized a graphite counter electrode as the second electrode. The CV analysis was carried out using a 3 mm diameter glassy carbon disc working electrode (first electrode) to determine both the electrochemical window and the redox potential of the active species. The CV experiments initiated from the open circuit potential (OCP) with a potential scan rate of 20 mV/s.

Figure 17:
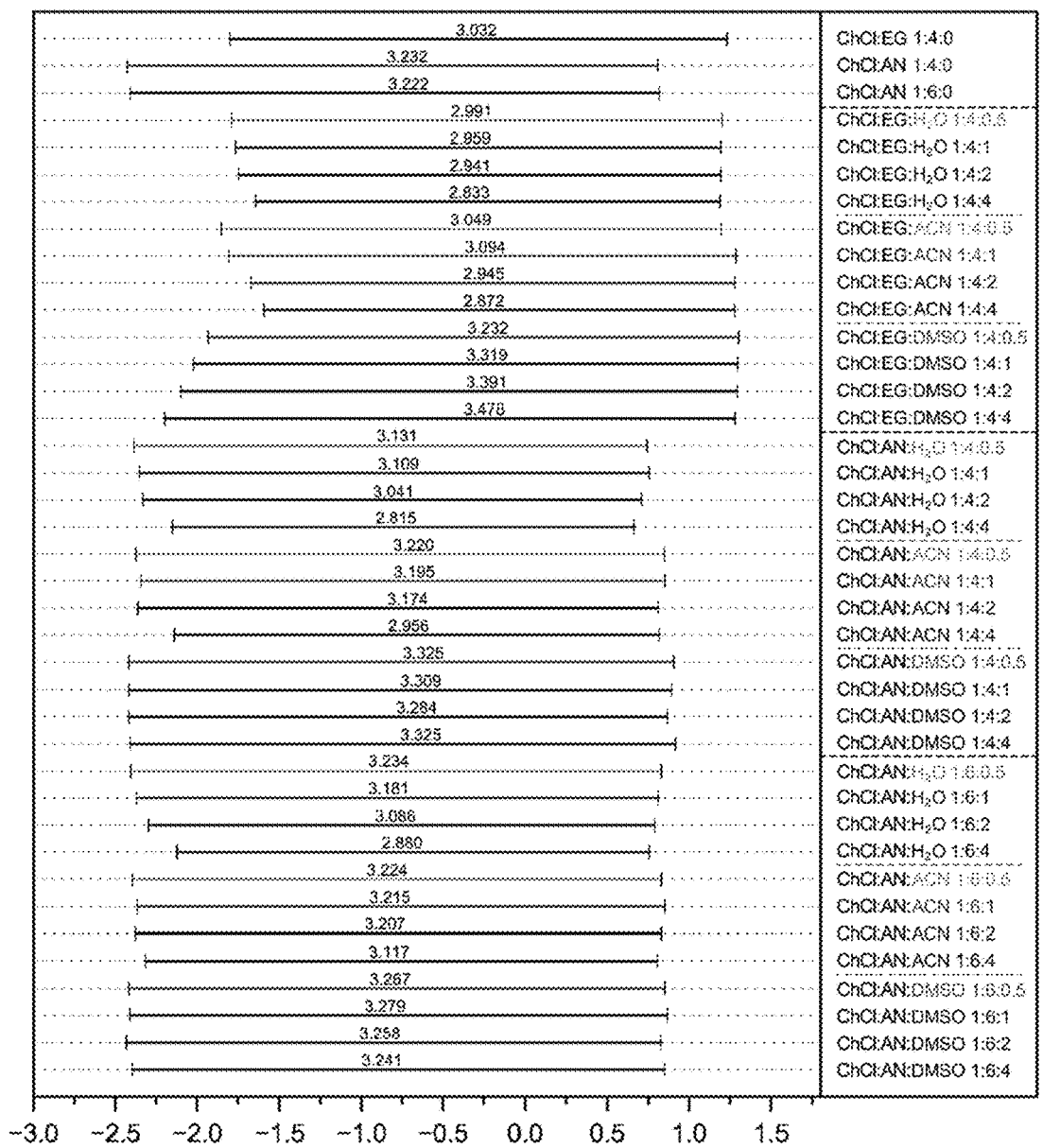
FIG. 17 is a diagram showing electrochemical stability windows (ESWs) measured by cyclic voltammetry (CV) at a scan rate of 20 mV/s using an electrochemical characterization apparatus/system according to the present disclosure comprising a glassy carbon disc (3 mm diameter) as the first electrode, graphite felt as the second electrode, and Ag/AgCl as a reference electrode.

To assess the electrochemical stability window (ESW) of the eutectics alongside co-solvents, cyclic voltammetry measurements were performed at the same scan rate of 20 mV/s. For ease of comparison, the measured ESWs, with a cutoff current of 0.02 mA, are graphically represented as lines in FIG. 17. This approach provides valuable insights into the stability ranges of the compounds under investigation and facilitates a comprehensive evaluation of their electrochemical behavior.

Through a series of examples, the versatility and advantages of the electrochemical characterization apparatus were demonstrated. The apparatus exhibits remarkable design flexibility, allowing for customization according to specific research needs. The integration with the robotic platform ensures a high level of automation, reducing experimental time and effort. Furthermore, the apparatus/system enables conductivity measurements of various electrolytes, enhancing its capabilities for data-driven research and accelerating the discovery of energy materials.

In view of the many possible embodiments to which the principles of the present disclosure may be applied, it should be recognized that the illustrated embodiments are only preferred examples of the present disclosure and should not be taken as limiting the scope of the disclosure. Rather, the scope is defined by the following claims. We therefore claim as our invention all that comes within the scope and spirit of these claims.

We claim:

1. An electrochemical characterization apparatus, comprising:
   an electrode pair comprising (i) a first electrode, or a plurality thereof; and (ii) a second electrode selected from a unitary second electrode or a plurality of second electrodes;
   a holder component comprising an electrode-accepting unit that is physically coupled with the first electrode, or a plurality of electrode-accepting units that are, independently, physically coupled with individual first electrodes of the plurality of first electrodes; and
   a second electrode containment component comprising an opening that holds the second electrode, wherein the opening is free from any electrolyte prior to or during use.

2. The electrochemical characterization apparatus of claim 1, wherein (i) the electrode-accepting unit comprises an opening within the holder component and wherein the first electrode is held within the opening; or (ii) a plurality of electrode-accepting units is present and is a plurality of openings within the holder component and wherein individual first electrodes of the plurality of first electrodes are held within individual openings of the plurality of openings.

3. The electrochemical characterization apparatus of claim 1, wherein the apparatus comprises the plurality of first electrodes and each first electrode of the plurality is different from other electrodes of the plurality of first electrodes.

4. The electrochemical characterization apparatus of claim 1, wherein the first electrode is a working electrode.

5. The electrochemical characterization apparatus of claim 4, further comprising a reference electrode, or a plurality thereof, wherein the reference electrode is, or the plurality thereof are, held by the holder component.

6. The electrochemical characterization apparatus of claim 1, wherein the second electrode is the unitary second electrode and wherein the unitary second electrode is contained in the opening of the second electrode containment component.

7. The electrochemical characterization apparatus of claim 1, wherein the second electrode is the plurality of second electrodes and wherein individual electrodes of the plurality of second electrodes are contained within the opening of the second electrode containment component and are separated from any adjacent electrode of the plurality of second electrodes by a void space or a separator, or wherein individual electrodes of the plurality of second electrodes physically touch any adjacent second electrode.

8. The electrochemical characterization apparatus of claim 1, wherein second electrode is a counter electrode.

9. The electrochemical characterization apparatus of claim 1, further comprising a cell plate that is positioned on a top surface of the second electrode and wherein the cell plate comprises a plurality of cells.

10. The electrochemical characterization apparatus of claim 9, wherein each cell of the plurality of cells has (i) a first opening that allows an electrolyte deposited therein to physically contact the second electrode when the cell plate is positioned on the top surface of the second electrode and (ii) a second opening that allows the electrolyte to physically contact the first electrode or individual electrodes of the plurality of first electrodes.

11. The electrochemical characterization apparatus of claim 9, wherein the cell plate further comprises O-rings positioned at the first opening of each cell of the plurality of cells, wherein the O-rings physically touch the top surface of the second electrode.

12. The electrochemical characterization apparatus of claim 9, further comprising an electrolyte contained within the plurality of cells, wherein the electrolyte contacts the top surface of the second electrode.

13. The electrochemical characterization apparatus of claim 1, further comprising one or more measurement devices electrically coupled to the first electrode or the plurality thereof.

14. A system, comprising:
   an electrochemical characterization apparatus according to claim 1;
   a cell plate comprising a plurality of cells, wherein the cell plate is positioned on a top surface of the second electrode;
   a robotic or manual sampling platform; and
   a measurement device; a dispensing device; a reference electrode, or plurality thereof; a power source; or a combination thereof.

15. The system of claim 14, wherein the robotic or manual sampling platform is used to control movement of the holder component and the first electrode, or the plurality thereof, such that the first electrode is, or individual first electrodes of the plurality of first electrodes are, disposed within individual cells of the cell plate.

16. The system of claim 14, wherein the system comprises the measurement device and the measurement device comprises one or more potentiostats electrically coupled to first electrode or individual electrodes of the plurality of first electrodes.

17. The system of claim 14, wherein the system comprises the electrolyte dispensing device and the electrolyte dispensing device is used to add an electrolyte to cells of the cell plate.

18. A method for conducting electrochemical characterization, comprising:
   providing a system according to claim 14;
   adding an electrolyte into cells of the cell plate;
   using the robotic or manual sampling platform to control movement of the holder component of the electrochemical characterization apparatus such that the first electrode is, or the plurality thereof are, disposed into the electrolyte contained within individual cells of the cell plate;
   performing electrochemical screening with the system; and
   measuring a performance of the electrolyte, the plurality of first electrodes, or the second electrode during the electrochemical screening.

19. The method of claim 18, wherein the performance of the electrolyte, the plurality of first electrodes, or the second electrode during the electrochemical screening is measured using electrochemical impedance spectroscopy, an electronic conductivity measurement technique, a coulombic efficiency measurement technique, or an ion transfer measurement technique.

20. The method of claim 18, wherein adding the electrolyte comprises adding a plurality of different electrolytes into the cells such that each cell of the plurality of cells contains a different electrolyte.

* * * * *